(12) United States Patent
Kurita et al.

(10) Patent No.: US 7,299,653 B2
(45) Date of Patent: Nov. 27, 2007

(54) REFRIGERATOR SYSTEM USING NON-AZEOTROPIC REFRIGERANT, AND NON-AZEOTROPIC REFRIGERANT FOR VERY LOW TEMPERATURE USED FOR THE SYSTEM

(75) Inventors: Susumu Kurita, Tokyo (JP); Nobuyoshi Kurita, Tokyo (JP)

(73) Assignee: Nihon Freezer Co., Ltd., Tokyo (JP)

( * ) Notice: Subject to any disclaimer, the term of this patent is extended or adjusted under 35 U.S.C. 154(b) by 237 days.

(21) Appl. No.: 10/537,261

(22) PCT Filed: Dec. 3, 2002

(86) PCT No.: PCT/JP02/12685

§ 371 (c)(1),
(2), (4) Date: Jun. 1, 2005

(87) PCT Pub. No.: WO2004/051155

PCT Pub. Date: Jun. 17, 2004

(65) Prior Publication Data

US 2006/0065013 A1    Mar. 30, 2006

(51) Int. Cl.
*F25B 41/00* (2006.01)
(52) U.S. Cl. .......................................... 62/513; 62/114
(58) Field of Classification Search .................. 62/114, 62/498, 513; 257/67
See application file for complete search history.

(56) References Cited

U.S. PATENT DOCUMENTS 5,265,443 A * 11/1993 Yuzawa et al. ............... 62/498

5,337,572 A     8/1994 Longsworth
5,827,446 A *  10/1998 Merchant et al. ................ 252/8
6,032,473 A *   3/2000 Morimoto et al. ............. 62/205
6,261,472 B1 *  7/2001 Felix et al. ..................... 252/67

FOREIGN PATENT DOCUMENTS

| JP | 51-83258 | 7/1976 |
| JP | 5-45867 | 7/1993 |
| JP | 8-166172 | 6/1996 |
| JP | 10-205899 | 8/1998 |
| JP | 2001-99498 | 4/2001 |

* cited by examiner

*Primary Examiner*—Melvin Jones
(74) *Attorney, Agent, or Firm*—Westerman, Hattori, Daniels & Adrian, LLP.

(57) ABSTRACT

A single-stage refrigerating system includes a compressor, a condenser, an evaporator, and a heat exchanger for exchanging heat between a refrigerant in a path from the evaporator to the compressor and a refrigerant in another path from the condenser to the evaporator, and a non-azeotropic refrigerant mixture used in the system. The refrigerant mixture is a combination of a refrigerant having a normal boiling point of approximately room temperature and a low-boiling-point refrigerant having a normal boiling point below −60° C. A dew point of the refrigerant mixture at a pressure in the condensing process after the compression is above room temperature. The boiling point is higher than the dew point at a pressure in the lower-pressure region in a path from the evaporator to the compressor. The combination may include butane or isobutane as the high-boiling-point refrigerant component having a normal boiling point of approximately room temperature and having a low evaporating pressure and ethane or ethylene as the low-boiling-point refrigerant component suitable for achieving ultra-low temperature.

8 Claims, 19 Drawing Sheets

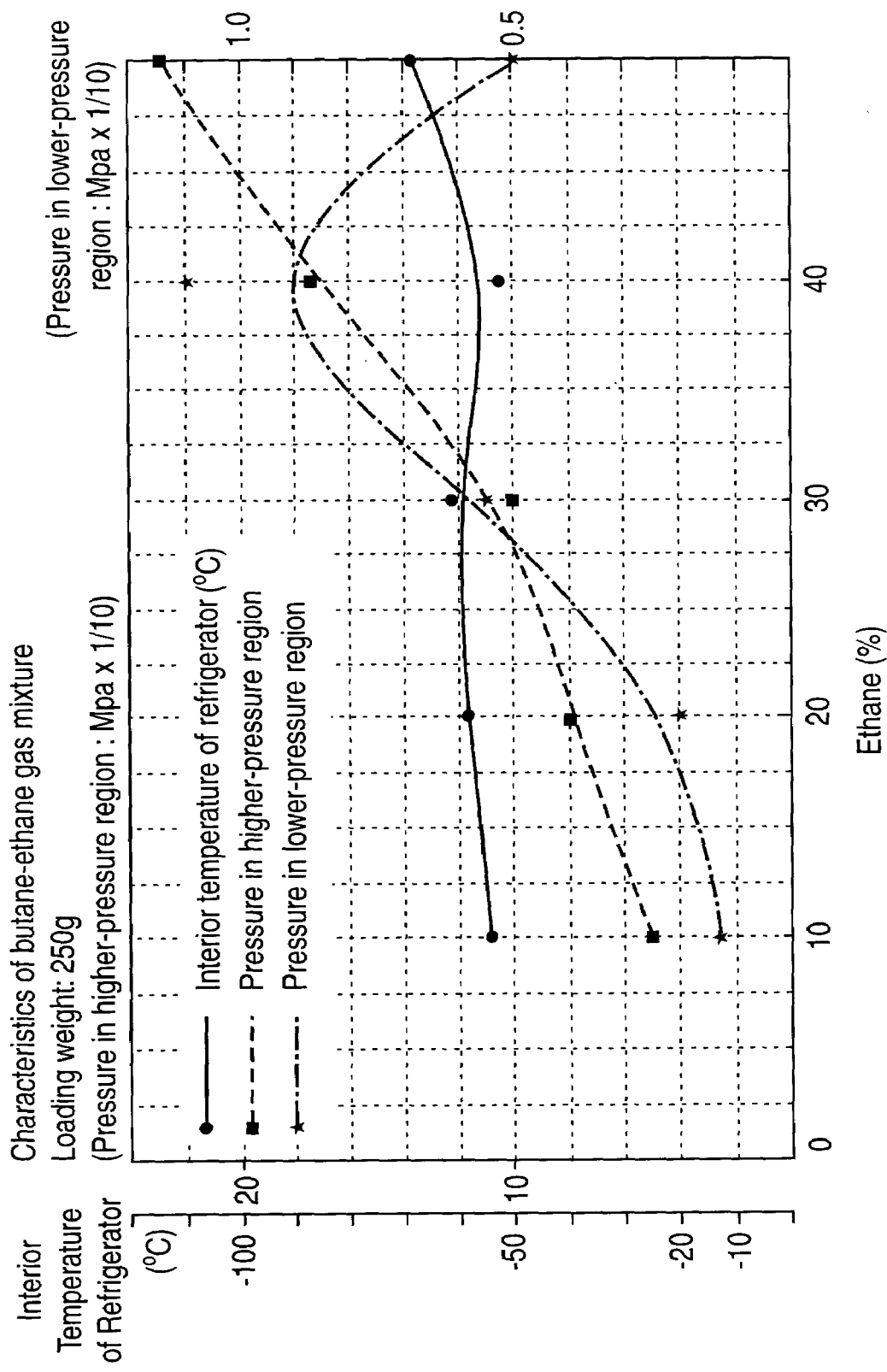

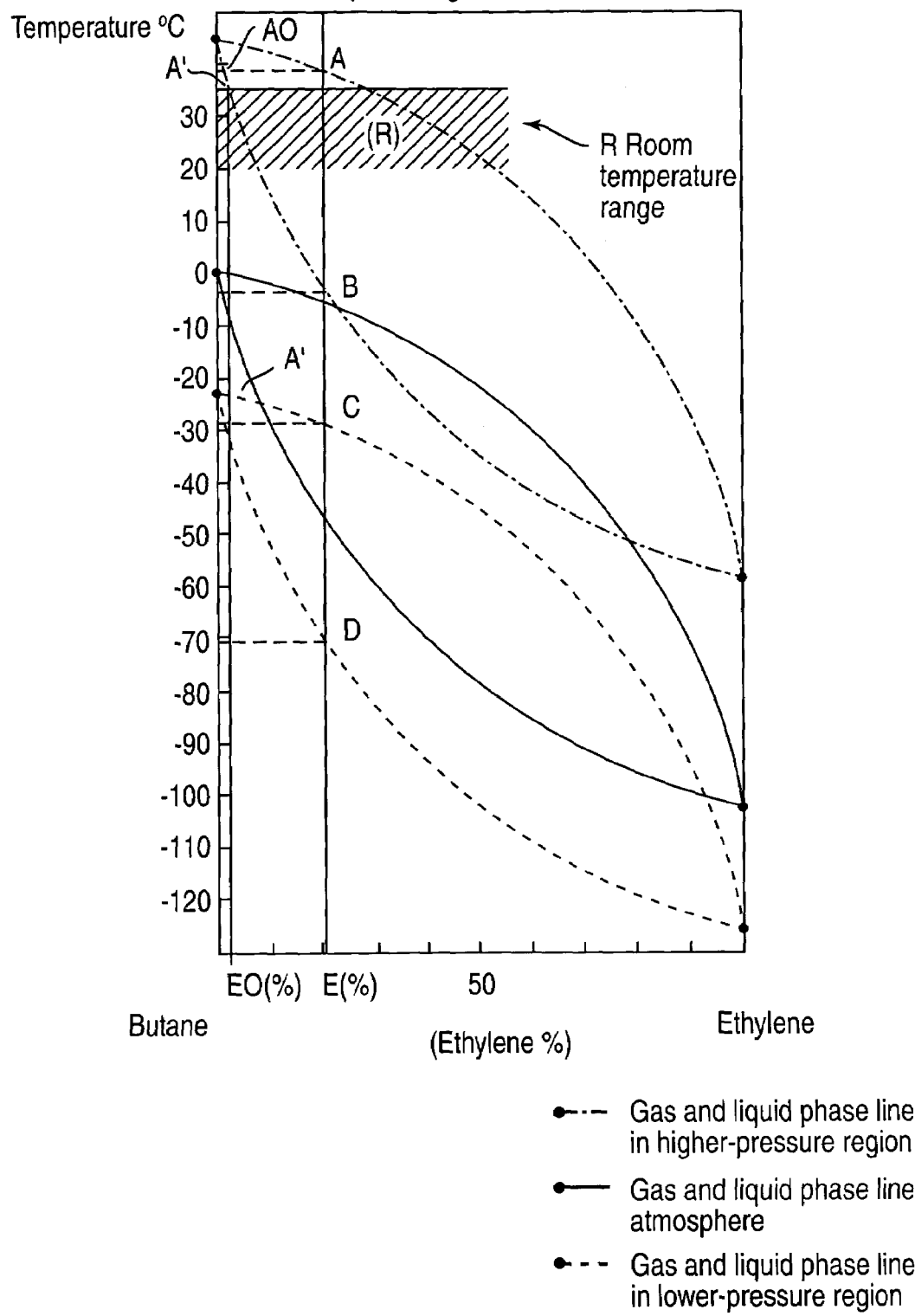

REFRIGERATOR SYSTEM USING NON-AZEOTROPIC REFRIGERANT, AND NON-AZEOTROPIC REFRIGERANT FOR VERY LOW TEMPERATURE USED FOR THE SYSTEM

TECHNICAL FIELD

The present invention relates to single-stage refrigerating systems, each having a single compressor and condenser, which are operable in room temperature by utilizing characteristics of non-azeotropic refrigerants in non-azeotropic refrigerant mixtures. In particular, the present invention relates to a refrigerant which cools a system to an ultra-low temperature, below −40° C., especially, below −60° C., and relates to the refrigerant, such as hydrocarbon refrigerant gas or chlorine-free fluorocarbon, for achieving such an ultra-low temperature in the system.

BACKGROUND ART

Fluorocarbons, or flon, have been widely used as refrigerants for freezers and refrigerators, however, some fluorocarbons containing chlorine destroy the ozone layer in the upper atmosphere. Therefore, as alternates for them, chlorine-free fluorocarbon or hydrocarbon refrigerants are required.

However, most of the chlorine-free fluorocarbons significantly absorb long-wavelength infrared rays. This causes global warming. Therefore, it is required to use as small amount as possible of materials showing minimal greenhouse effects.

Gases that satisfy the required refrigerant characteristics and that mainly contain hydrocarbons having a low boiling point have been searched for. However, since the choice of gases is restricted, it is difficult to find a single gas that satisfies these requirements. Consequently, two or more gases are mixed to adjust the characteristics of the refrigerants.

However, azeotropic refrigerant mixtures showing a constant boiling point are restricted in both combination and composition. Unlike single-component refrigerant gases that are widely used, many of the refrigerant mixtures composed of two or more components show a non-azeotropic characteristic.

These non-azeotropic refrigerant mixtures are different from refrigerants of single components or azeotropic refrigerant mixtures in that they can be given required intermediate characteristics deduced from properties of individual gases by selecting the ratio of these gases. On the other hand, since boiling points and dew points of these refrigerant mixtures are separated from each other, the composition in a gas phase and the composition in a liquefied or condensed phase are different from each other under conditions in which both a liquid phase and a gas phase are present. Therefore, during the condensing processes, these refrigerant mixtures cannot be condensed at constant temperatures and pressures, resulting in unstable operation of the refrigerating systems.

In order to resolve these problems, for example, Japanese Unexamined Patent Application Publication No. 51-83258 and Japanese Examined Patent Publication No. 5-45867 disclose refrigerating systems using non-azeotropic refrigerant mixtures. The temperature and pressure in each refrigerating system are controlled through an expansion valve depending on the evaporating pressure of the non-azeotropic refrigerant mixture and the corresponding saturation temperature, and alerting means is operated when the controlled conditions deviate from predetermined ranges. Specifically, the latter discloses heat exchange between a lower-temperature inlet refrigerant in a path from an evaporator to a compressor and a pressured refrigerant in a path from the compressor to the evaporator.

Each of these refrigerating systems uses a combination of refrigerant components, i.e. refrigerant R-22 having a low boiling point and refrigerant R-114 having a high boiling point. Since the respective normal boiling points are −40.8° C. and 3.85° C., the difference between the dew point and the boiling point specific to the non-azeotropic refrigerant mixture is large. Therefore, problems such as absorption of the liquefied refrigerant by the compressor occur. Such a problem is avoided by the control of the refrigerating system.

In Japanese Unexamined Patent Application Publication No. 8-166172, all of refrigerant components used in examples are fluorocarbons, i.e. R-32, R-125, and R-134a, and their normal boiling points are −51.7° C., −48.5° C., and −26.5° C., respectively. A non-azeotropic refrigerant mixture composed of these refrigerants is not liquefied until the mixture is cooled to a temperature significantly lower than room temperature. Consequently, a refrigerating system including a compressor, a condenser, a receiver, a decompressor, and an evaporator is further provided with a heat exchanger exchanging heat between the refrigerant flowing from the condenser to the receiver and the refrigerant flowing from the evaporator to the compressor.

The difference in boiling point between these refrigerants is small, namely, the above-mentioned problem is avoided by using a refrigerant mixture having a small difference between a dew point and a boiling point. In the condition in which both a gas phase and a liquid phase are present in the refrigerating system, only the liquefied non-azeotropic refrigerant mixture is separated by the receiver and is sent to the evaporator. Furthermore, gas-liquid separation is performed in suction piping in order to prevent hydraulic compression caused by mixing the liquefied refrigerant with a refrigerant gas that enters the compressor.

However, such a system construction is complicated. In addition, since the gaseous and liquid non-azeotropic refrigerant mixtures have different compositions when both a gas phase and a liquid phase are present, the system construction such that the gas-liquid separation is performed adversely affects a steady state control.

DISCLOSURE OF INVENTION

The present invention provides a refrigerating system using a non-azeotropic refrigerant mixture. The non-azeotropic refrigerant mixture includes a refrigerant having a normal boiling point of approximately room temperature and a low-boiling point refrigerant having a normal boiling point below −60° C. The refrigerating system is a single-stage refrigerating system including a compressor, a condenser, an evaporator, and a heat exchanger for exchanging heat between a refrigerant in a path from the evaporator to the compressor and a refrigerant in another path from the condenser to the evaporator. A dew point of the refrigerant mixture at a pressure in the condensing process after the compression is above room temperature, and the refrigerating system is operated in the range in which the boiling point is higher than the dew point at a pressure in the lower-pressure region in the path from the evaporator to the compressor. The present invention further provides a non-azeotropic refrigerant mixture for ultra-low temperature as a suitable refrigerant for this system. The non-azeotropic refrigerant mixture includes a refrigerant having a normal boiling point at approximately room temperature and a low-boiling-point refrigerant having a normal boiling point below −60° C. A dew point of the refrigerant mixture at a pressure in the condensing process after the compression is above room temperature, and the boiling point is higher than the dew point at a pressure in the lower-pressure region in the path from the evaporator to the compressor.

Specifically, the high-boiling-point gas having a boiling point of approximately room temperature is butane or isobutane and the low-boiling-point gas having a boiling point below −60° C. is ethane or ethylene. The non-azeotropic refrigerant mixture further contains R-14 (perfluoromethane) and thus improved characteristics.

The non-azeotropic refrigerant mixture for ultra-low temperature is improved in the characteristics by the following ways:

the high-boiling-point gas is butane and the low-boiling-point gas is ethane, the mixing ratio of the butane-ethane gas mixture is in the range from 90/10 to 60/40, and the content of R-14 (perfluoromethane) in the gas mixture is between above 0% and of 9%;

the high-boiling-point gas is butane and the low-boiling-point gas is ethylene, the mixing ratio of the butane-ethylene gas mixture is in the range from 90/10 to 70/30, and the content of R-14 (perfluoromethane) in the gas mixture is between above 0% and 0.7%;

the high-boiling-point gas is isobutane and the low-boiling-point gas is ethane, the mixing ratio of the isobutane-ethane gas mixture is in the range from 90/10 to 70/30, and the content of R-14 (perfluoromethane) in the gas mixture is between above 0% and 15%; or the high-boiling-point gas is isobutane and the low-boiling-point gas is ethylene, the mixing ratio of the isobutane-ethylene gas mixture is in the range from 90/10 to 80/20, and the content of R-14 (perfluoromethane) in the gas mixture is between above 0% and 10%.

BEST MODE FOR CARRYING OUT THE INVENTION

The inventors discovered a non-azeotropic refrigerant mixture which can be used in room temperature during the processes of searching for chlorine-free hydrocarbon azeotropic refrigerants for ultra-low temperature. The non-azeotropic refrigerant mixture is prepared by mixing a hydrocarbon having a high normal boiling point of approximately room temperature and a low vapor pressure with a hydrocarbon refrigerant gas achieving ultra-low temperature below −60° C., i.e. a hydrocarbon having an extremely low normal boiling point.

Namely, if a non-azeotropic refrigerant mixture can be condensed in the compressing process at approximately room temperature or if a non-azeotropic refrigerant mixture can be condensed during cooling by heat exchanging with a refrigerant from the evaporator as described above, a complicated structure for gas-liquid separation is unnecessary even in a non-azeotropic refrigerant mixture. Thus, the system can be simplified. Specifically, the above-mentioned unstable operation of the refrigerator, which is caused by characteristics inherent in a non-azeotropic refrigerant mixture having a boiling point and a dew point separated from each other, can be resolved.

Characteristics of the non-azeotropic refrigerant mixtures and systems using them will now be described.

FIG. 20 schematically shows a phase diagram of a non-azeotropic refrigerant mixture composed of butane and ethylene as an example.

When butane (boiling point: −0.5° C.) and ethylene (boiling point: −103.7° C.) are used, gas and liquid phase lines expressing dew and boiling points are generally separate in the vertical direction.

A phase diagram at a higher pressure in a condensing process by a compressor and a phase diagram at a lower pressure in the evaporating process are indicated by alternate long and short dashed lines and broken lines, respectively. The phase diagrams shit from the phase diagram at atmospheric pressure substantially in the vertical direction.

In a combination of component gases having remarkably different boiling points, such as butane and ethylene, the phase diagrams remarkably incline from a high boiling point to a low boiling point as shown in the drawing. In such a combination, a slight change in the composition significantly varies the boiling points and dew points.

If a refrigerator is driven at a room temperature (R) ranging from 20° C. to 35° C. as shown by hatching in the drawing, the liquid-phase line of the higher-pressure region must lie above this temperature range for being operable at these temperatures. At the same time, the gas-phase line of the lower-pressure region must lie below a refrigerant temperature when the suction into a compressor occurs so as to avoid the hydraulic compression by the compressor.

In the drawing, the range for satisfying the former conditions is a composition of E0 (%) or less. The E0 (%) is defined by a perpendicular line from point A' at which a horizontal line at 35° C. intersects the liquid phase line of the higher-pressure region. In order to satisfy the latter conditions, this system is necessary to be operated in the temperature range in the left side of point A" and above the gas-phase line of the lower-pressure region, the perpendicular line intersecting the gas-phase line of the lower-pressure region at point A".

When a non-azeotropic refrigerant mixture is used in a single-stage refrigerating system including a unit of single compressor, condenser, and evaporator, special controlling or a dedicated gas-liquid separator is not necessary if the above-mentioned conditions are satisfied. Furthermore, the refrigerating system can have a simplified structure.

However, the area that satisfies the former conditions is extremely narrow as shown in the drawing, and the latter conditions cannot be satisfied at room temperature.

In order to achieve these conditions, especially the latter conditions, the system is required to be operated in the temperature range above the gas phase line of the lower-pressure region. This cannot be readily achieved because the refrigerant temperature after the evaporating process is low. Therefore, as described above, heat exchange between the refrigerants of the lower-pressure region and the higher-pressure region is performed and condensation at the higher-pressure region is also accelerated.

The inventors have found that the problems inherent in the non-azeotropic refrigerant mixture can be resolved by utilizing the difference between the dew point and the boiling point in the heat exchange conditions.

As shown in the drawing, when the refrigerant mixture contains a high-boiling-point component, the composition range in which the dew point is present above room temperature is moderately broad. Therefore, in this range, a refrigerating system can dissipate the heat to the outside of the system, i.e. to ambient atmosphere.

At the interior of the system, it is required that the gases at the higher-pressure region are entirely condensed and liquefied by heat exchange and that the refrigerant mixture at the lower-pressure region is entirely gasified.

Namely, from a viewpoint of the heat exchange between the interior and exterior of the system, the single-stage refrigerating system must dissipate heat quantity taken into the system by the condenser at the environmental temperature. A possible lowest freezing temperature is determined by a boiling point of the refrigerant mixture condensable during the condensing process. When conditions for the condensation/liquefaction of the refrigerant mixture at the higher-pressure region and for the evaporation/gasification of the refrigerant mixture at the lower-pressure region are satisfied, the above-mentioned single-stage refrigerating system can be constructed.

Therefore, if a refrigerant mixture had dew points higher than environmental temperature and the heat exchange between the refrigerant in a condensation/liquefaction condition and the refrigerant in an evaporation/gasification condition is achieved, the problem can be resolved.

The above-mentioned phase diagram of the non-azeotropic refrigerant mixture indicates that the conditions are achieved by the refrigerant mixture having the liquid-phase line of the higher-pressure region lying above the gas-phase line of the lower-pressure region.

The relationship between the temperature and a refrigerant having a composition containing E (%) ethylene of which the gas-phase line of the higher-pressure region lies above room temperature is shown in the drawing. The intersections of perpendicular line from point E and gas or liquid phase line under each pressure are A, B, C, and D, from the top. When point A is higher than room temperature and when point B is higher than point C, the above-mentioned conditions can be satisfied. If heat loss is neglected, point D is the lowest temperature to be achieved.

In order to achieve these systems, loss from theoretical conditions must be taken into consideration. Regarding the heat balance with the exterior of the system, heat dissipation by the latent heat in the condenser must be sufficiently great and the interval between points B and C must be large so that the heat is sufficiently transferred. Since this heat quantity depends on the composition containing a large amount of high-boiling-point refrigerant, the optimum range, in addition to the above-mentioned conditions, must be determined so as to achieve the target freezing temperature.

Since characteristics of these non-azeotropic refrigerant mixtures are not sufficiently investigated, the quantitative relation is not yet known and usable data for determining actual conditions is poor. However, in actual use, the conditions may be empirically and experimentally determined from the properties of individual refrigerants.

Examples of a high-boiling-point gas having a normal boiling point of approximately room temperature and being usable for the above-mentioned systems include butane, isobutane, butene ($C_4H_8$) isomers, ethylacetylene ($C_4H_6$), and R-134a ($CH_2FCF_3$). Examples of a low-boiling-point gas used for achieving ultra-low temperature according to the present invention include ethane, ethylene, and chlorine-free fluorocarbon such as R-14 (perfluoromethane).

In order to achieve ultra-low temperature by a mixture of these gases, the mixture is required to contain a large amount of the low-boiling-point gas. As a result, the pressure during the condensation becomes significantly high. However, as described above, since both the gas and liquid phases of the non-azeotropic refrigerant mixture can be present over wide ranges of temperature and pressure, a liquid phase containing a large amount of the high-boiling-point component after the evaporation process certainly remains. By the utilization of latent heat of this remaining liquid phase for cooling the high-pressure refrigerant from the compressor, the condensing process is accelerated below 15 atmospheres, which is an actually applicable range to the compressor (maximum: 20 atmospheres). Thus, the ultra-low temperature by operating a single-stage refrigerating system can be achieved.

Examples of refrigerant gases suitable for the present invention and characteristics of these refrigerants are cited below.

TABLE 1

Physical characteristics of high-boiling-point and low-boiling-point gases

| | Chemical Formula | Boiling Point (° C., 1 atm) | Critical Temperature (° C.) | Vapor Pressure (MPa) |
|---|---|---|---|---|
| Butane | $C_4H_{10}$ | −0.5 | 153.2 | 0.11 (21° C.) |
| Isobutane | $C_4H_{10}$ | −11.7 | 135.0 | 0.22 (21° C.) |
| 1-butene | 1-$C_4H_8$ | −6.26 | 146 | 0.17 (21° C.) |
| Cis-2-butene | Cis-2-$C_4H_8$ | 3.72 | 155 | 0.1 (21° C.) |
| Trans-2-butene | Trans-2-$C_4H_8$ | 0.89 | 155 | 0.1 (21° C.) |
| Isobutene | i-$C_4H_8$ | −6.9 | 145 | 0.17 (21° C.) |
| Ethylacetylene | $C_4H_6$ | 8.1 | 191 | 0.05 (21° C.) |
| R-134a | $CH_2FCF_3$ | −26.1 | 101.2 | 0.58 (21° C.) |
| Ethylene | $C_2H_4$ | −103.7 | 9.2 | 5.2 (9.9° C.) |
| Ethane | $C_2H_6$ | −88.65 | 32.2 | 3.8 (21° C.) |
| R-14 | $CF_4$ | −128 | −46 | 3.69 (21° C.) |

Butane and isobutane cited above, which are hydrocarbons widely used as fuel, are used as high-boiling-point gas components of non-azeotropic refrigerant mixtures according to the present invention. Butane and isobutane have boiling points approximately room temperature, i.e. at −0.5° C. and −11.7° C., respectively, as shown above, and have very low vapor pressures. Therefore, they can be liquefied at comparatively low pressure. Butenes, ethylacetylene, and R-134a also have similar characteristics.

Ethane, ethylene, and R-14 which is a component added to a refrigerant mixture thereof, shown in the above table, are low-boiling-point components for achieving ultra-low temperature. All of these components have normal boiling points of lower than −60° C., which is effective for achieving ultra-low temperature. However, their critical temperatures are low and their vapor pressures are high. Hence, these gases cannot be readily condensed at an ambient temperature environment. Especially, R-14 cannot be alone used for a single-stage refrigerating system. R-14, however, can be used in a combination with a high-boiling-point component having a low vapor pressure for raising the liquefaction/condensation temperature and reducing the vapor pressure. This refrigerant is cooled by heat exchanging. Namely, the refrigerant at high temperature and high pressure flowing from a compressor to an evaporator is cooled by the refrigerant at low temperature flowing from the evaporator to the compressor. The condensation and liquefaction of this refrigerant can be performed at a pressure in the range of 15 to 20 atmospheres (1.5 MPa to 2.0 MPa), which is applicable to general compressors. Thus, this single-stage refrigerating system can be operated.

Since such heat exchange is limited to the exchange of internal heat of the refrigerating system, it is required to effectively dissipate the internal heat of the system to the external environment at room temperature in order to operate the entire refrigerating system. In the present invention, the freezing ability of the system is maintained by dissipating the latent heat of the refrigerant mixture containing a large amount of high-boiling-point component and having a low-vapor pressure through the condenser.

Therefore, in order to maintain the refrigerating system, it is required that the high-boiling-point component is liquefied at an ambient-temperature environment and that the refrigerant system has a large volume of charged refrigerant and a high-capacity condenser for dissipating a sufficient amount of latent heat.

FIG. 1 schematically shows a refrigerating system used in examples according to the present invention.

In the drawing, reference numeral 1 represents a compressor. A refrigerant gas dissipated from the compressor flows in a forward piping 10 to a condenser 2, a heat exchanger 50, and then a throttle valve (capillary tube) 6 where the gas is decompressed. The refrigerant gas is then gasified at an evaporator 7 in a refrigerator 8 to cool the interior of the refrigerator. The backward gas generated in the evaporator returns via a backward piping 12 to the compressor after cooling the forward refrigerant at the heat exchanger 50.

In a refrigerating system using a non-azeotropic refrigerant mixture, the composition of the refrigerant mixture which is decompressed at the evaporator is composed of a gas phase containing a large amount of low-boiling-point component and a condensed liquid phase containing a large amount of high-boiling-point component, as the pressure decreases. Such refrigerant is sent to the suction side of the compressor as a wet gas, but the suction of this condensed liquid is undesirable for the compressor. Therefore, in the above-mentioned known technique, the backward refrigerant is operated under a condition in which the condensed phase is not generated or the backward refrigerant is separated into gas and liquid phases by an accumulator.

The present invention takes advantages of such characteristics of the non-azeotropic refrigerant mixture, which cause troubles during the operation of conventional refrigerators. Namely, in the heat exchanging between the backward refrigerant and the refrigerant at the higher-pressure region (forward refrigerant), the gas at the higher-pressure region is thoroughly condensed by the latent heat from the condensed liquid phase of the backward refrigerant and the liquid phase of the backward refrigerant is thoroughly gasified. Thus, the initial composition of the refrigerant gas mixture can be maintained through circulation in the system to achieve stably operating conditions.

As described above, the function of the heat exchanger is important. However, any type of heat exchanger having high heat-exchange ability can be used.

The structure of the heat exchanger according to the present invention is shown in FIG. 2. The forward piping 10 from the compressor and the backward piping 12 from the evaporator are soldered (shown as 15) and the length L of the heat exchanger is 3 m in order to provide the heat exchange condition according to the present invention as described above.

The conditions for operating the heat exchanger and the results are shown below.

A refrigerating system used in experiments is as follows:
Refrigerator: model SC-15CNX (Danforth Corp.), Capacity: 213 liters,
Throttle valve: capillary tube, In Experiment 1, 250 g of a butane-ethylene non-azeotropic refrigerant mixture containing 15% ethylene was used. In Experiment 2, 10 g (4%) of R-14 (fluoromethane) was further added to the mixture in Experiment 1.

Measured portions shown in FIG. 2 are as follows:
A for inlet of lower-pressure region, B for outlet of higher-pressure region, E for outlet of lower-pressure region, and F for inlet of higher-pressure region.

Piping temperatures and gauge pressures were measured.

TABLE 2

Temperature distribution in heat exchanger (room temperature: 30° C.)

| | Experiment No. | |
|---|---|---|
| | 1 | 2 |
| Interior Temperature of Refrigerator (° C.) | −74.6 | −81.8 |
| Pressure in Higher-Pressure Region (MPa) | 0.9 | 1.5 |
| Pressure in Lower-Pressure Region (MPa) | 0.02 | 0.02 |
| Inlet of Lower-Pressure Region (° C.) | −49.5 | −38.0 |
| Outlet of Lower-Pressure Region (° C.) | 9.2 | 12.2 |
| Inlet of Higher-Pressure Region (° C.) | 29.4 | 27.8 |
| Outlet of Higher-Pressure Region (° C.) | −38.8 | −31.6 |

As shown in Table 2, the inlet temperatures of the higher-pressure region were lower than room temperature. This is because the wall temperatures of the heat exchanger were measured. The wall temperatures were influenced by the heat-exchanging opponents. Therefore, the actual temperatures were slightly higher than the observed data, i.e. all of them were higher than room temperature. Similarly, the actual temperatures at the outlet in the higher-pressure region were lower than the observed temperatures. The temperatures at the lower-pressure regions showed similar differences between the actual and observed temperatures.

Thus, the backward gas at the suction side of the compressor was almost the same temperature as room temperature, and the temperature of the refrigerant toward the evaporator was lower than the boiling point on such a high-pressure occasion. Therefore, the above-mentioned conditions are achieved.

Tables 3 and 4 show the relation between the pressure and temperature of refrigerants at the high- and lower-pressure regions which were achieved in the heat exchanger when R-14 of 0 to 3.85% were added to butane-ethylene refrigerant mixtures (mixing ratio: 90/10 or 85/15).

The refrigerating system was used at the same conditions as the above-mentioned (1).

TABLE 3

Heat exchange condition at butane-ethylene mixing ratio 90/10 (room temperature: 30° C.)

| R-14 (%) | 0 | 1.96 | 3.8 |
|---|---|---|---|
| Interior Temperature of Refrigerator (° C.) | −66.7 | −70.2 | −71.6 |
| Pressure in Higher-Pressure Region (MPa) | 0.8 | 1.45 | 1.75 |
| Pressure in Lower-Pressure Region (MPa) | 0.010 | 0.010 | 0.025 |
| Inlet of Lower-Pressure Region (° C.) | −41.0 | −42.0 | −37.0 |
| Outlet of Lower-Pressure Region (° C.) | 15.0 | 10.0 | 9.0 |
| Inlet of Higher-Pressure Region (° C.) | 28.0 | 26.0 | 26.0 |
| Outlet of Higher-Pressure Region (° C.) | −36.0 | −37.4 | −31.9 |

TABLE 4

Heat exchange condition at butane-ethylene mixing ratio 85/15 (room temperature: 30° C.)

| R-14 (%) | 0 | 1.96 | 3.85 |
|---|---|---|---|
| Interior Temperature of Refrigerator (° C.) | −74.5 | −80.6 | −83.9 |
| Pressure in Higher-Pressure Region (MPa) | 0.8 | 1.20 | 1.70 |
| Pressure in Lower-Pressure Region (MPa) | 0.025 | 0.010 | 0.020 |
| Inlet of Lower-Pressure Region (° C.) | −51.6 | −44.5 | −44.1 |
| Outlet of Lower-Pressure Region (° C.) | 8.3 | 15.0 | 12.0 |
| Inlet of Higher-Pressure Region (° C.) | 31.0 | 27.0 | 26.3 |
| Outlet of Higher-Pressure Region (° C.) | −45.2 | −39.4 | −38.4 |

(1) Confirmation of Characteristics of butane-ethane Mixture and Non-Azeotropic Refrigerant Mixture of R-14-Containing butane-ethane Gas Mixture Experiment 1

The characteristics of butane-ethane gas mixture as a refrigerant were confirmed by actually operating the refrigerating system shown in FIG. 1 and the results were used as basic data. The results are shown in Table 5 and FIG. 3.

TABLE 5

Charcteristics of butane-ethane mixture gas (loading weight: 250 g)

| Ethane (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 10 | 5.0 | 0.13 | −54.0 |
| 20 | 8.0 | 0.2 | −58.5 |
| 30 | 10.0 | 0.55 | −61.5 |
| 40 | 17.5 | 1.1 | −52.5 |
| 50 | 23.0 | 0.5 | −69.0 |

Notes:
the pressures are gauge pressures, i.e. pressure differences from atmosphere. The following data obtained by practical operation are the same.

As shown in FIG. 3, there was a gentle peak achieving an interior temperature of the refrigerator of about −60° C. at an ethane content of about 20% to about 30%. The pressure in the higher-pressure region, i.e. at the compressor side, increased with the ethane content and then steeply increased at an ethane content above 30%.

A desired refrigerator for ultra-low temperature must be operated at an interior temperature of 60° C. or less and more preferably 80° C. or less. The interior temperature of the refrigerator decreased to about 60° C. at an ethane content between about 20% and about 30%, but the temperature was almost constant in such an ethane content and its vicinities. Although the effect of the refrigerant mixture gently decreased as the ethane content changed towards 10% or 40%, the temperatures were still maintained about 55° C. The interior temperature of the refrigerator decreased again at ethane content above 40%. However, the pressure in the higher-pressure region steeply increased. Therefore, such ethane contents were not applicable.

In order to improve the refrigerant characteristics in the range of the ethane content in which the interior temperatures of the refrigerator were almost constant and were maintained about −60° C., R-14 gas was added to the butane-ethane refrigerant gas mixture of which the mixing ratio were 90/10, 80/20, 70/30, or 60/40, i.e. ethane contents of 10%, 20%, 30%, and 40%, respectively. The changes in characteristics depending on the amount of R-14 were observed. The results are shown below.

The experimental conditions were the same as above. The results are shown in Tables 6, 7, 8, and 9 and in FIGS. 4, 5, 6, and 7, respectively.

Experiment 2

The effects of R-14 were observed by adding a predetermined amount of R-14 at an increment of 5 g to 250 g of a butane-ethane mixture having a mixing ratio of 90/10.

TABLE 6

Effects of addition of R-14 to butane-ethane mixture having a mixing ratio of 90/10

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 5.0 | 0.13 | −54.0 |
| 1.96 | 10.0 | 0.007 | −55.0 |
| 3.85 | 12.5 | 0 | −55.0 |
| 5.66 | 15.0 | 0.1 | −55.0 |
| 7.41 | 18.0 | 0.2 | −55.0 |
| 9.1 | 23.0 | 0.4 | −53.0 |

The data shown in Table 6 was plotted and represented graphically in FIG. 4. When R-14 was not added (0%), the interior temperature of the refrigerator was the level of −50° C. Then, even if R-14 was added, the temperature barely changed. The interior temperature of the refrigerator rather increased when the content was above about 7%. On the contrary, the pressure in the higher-pressure region steeply increased to reach the upper limit of actual use at R-14 content of about 9%.

Experiment 3

The effects of R-14 were observed by adding a predetermined amount of R-14 at an increment of 5 g to 250 g of a butane-ethane mixture having a mixing ratio of 80/20.

TABLE 7

Effects of addition of R-14 to butane-ethane mixture having a mixing ratio of 80/20

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 8.0 | 0.2 | −58.5 |
| 1.96 | 11.0 | 0.25 | −64.2 |
| 3.85 | 16.0 | 0.3 | −71.2 |
| 5.66 | 18.0 | 0.35 | −73.2 |
| 7.41 | 22.0 | 0.55 | −73.4 |
| 9.1 | 22.2 | 1.1 | −86.9 |
| 10.7 | | | |

The data shown in Table 7 was plotted and represented graphically in FIG. 5. When an R-14 content was slightly lower than 1%, an interior temperature of the refrigerator of −60° C. or less was achieved. The interior temperature of the refrigerator was effectively reduced, as the amount of R-14 increased. Specially, when an R-14 content was about 8% or more, the interior temperature of the refrigerator significantly decreased to −80° C. or below. However, both the pressures in the higher-pressure region and the lower-pressure region increased and reached the upper limit of actual use at an R-14 content of about 9%.

Experiment 4

The effects of R-14 were observed by adding a predetermined amount of R-14 at an increment of 5 g to 250 g of a butane-ethane mixture having a mixing ratio of 70/30.

TABLE 8

Effects of addition of R-14 to butane-ethane mixture having a mixing ratio of 70/30

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 10.0 | 0.55 | −61.5 |
| 1.96 | 13.0 | 0.7 | −65.1 |
| 3.85 | 14.0 | 0.7 | −70.0 |
| 5.66 | 15.5 | 0.7 | −77.2 |
| 7.41 | 17.0 | 0.8 | −82.3 |
| 9.1 | 20.0 | 1.0 | −85.0 |
| 10.7 | 20.0 | 1.0 | −85.0 |

The data shown in Table 8 was plotted and represented graphically in FIG. 6. When R-14 was not added (0%), the interior temperature of the refrigerator was below −60° C. The interior temperature of the refrigerator was effectively reduced, as the amount of R-14 increased. Both the pressures in the higher-pressure region and the lower-pressure region increased with the increase of R-14. When 9% to 10% R-14 was added, the interior temperature of the refrigerator reached −85° C. or below. However, the pressure in the lower-pressure region increased to 1.0 MPa×$10^{-1}$, i.e. reached the upper limit of actual use.

Experiment 5

The effects of R-4 were observed by adding a predetermined amount of R-14 at an increment of 5 g to 250 g of a butane-ethane mixture having a mixing ratio of 60/40.

TABLE 9

Effects of addition of R-14 to butane-ethane mixture having a mixing ratio of 60/40

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 17.5 | 1.1 | −52.5 |
| 1.96 | 19.0 | 1.2 | −56.4 |
| 3.85 | 21.0 | 1.4 | −59.8 |
| 5.66 | 21.5 | 1.5 | −62.3 |
| 7.41 | 24.0 | 1.5 | −67.2 |
| 9.1 | — | | |
| 10.7 | — | | |

The data shown in Table 9 was plotted and represented graphically in FIG. 7. When 4% or more R-14 was added, the interior temperature of the refrigerator reached −60° C. or below. Then, the decrease in the interior temperature of the refrigerator was gentle even if the amount of R-14 increased. Thus, the addition of R-14 was ineffective.

On the contrast, both the pressures in the higher-pressure and lower-pressure regions increased, especially, the pressure in the lower-pressure region showed near the upper limit of actual use even if R-14 was not added.

As observed above, the target characteristics of a refrigerant mixture according to the present invention are achieved by a butane-ethane refrigerant mixture containing ethane of between above 10% and below 40%, i.e. the butane-ethane mixing ratio from 90/10 to 60/40, and containing R-14 of between above 0% and 9%.

In such a range, the ternary non-azeotropic refrigerant mixture can maintain stable conditions over broad ranges of the pressures in the higher- and lower-pressure regions and the interior temperature of the refrigerator.

(2) Confirmation of Characteristics of butane-ethylene Mixture and Non-Azeotropic Refrigerant Mixture of R-14-Containing butane-ethylene Gas Mixture Though ethylene has an extremely low boiling point and characteristics suitable as a refrigerant for ultra-low temperature, it has an extremely high evaporating pressure and cannot be applied to a refrigerating system which is operated at room temperature (see Table 1).

Then, the above-mentioned butane was mixed with ethylene to prepare a refrigerant gas mixture. The characteristics of the gas mixture were identified and searched for a mixing ratio usable as a refrigerant mixture for a refrigerating system which is operated at room temperature. Furthermore, R-14 (perfluoromethane) was added to the refrigerant mixture in order to improve the characteristics as a refrigerant for ultra-low temperature. The characteristics and composition ratio of this refrigerant mixture were identified for achieving a target interior temperature of the refrigerator below −60° C. further an ultra-low temperature of −80° C. or less by a refrigerating system operated at room temperature without using a complicated double-stage refrigerating system.

The operating conditions such as the refrigerating system are the same as above.

Experiment 1: Confirmation of properties of butane-ethylene gas mixture as a refrigerant The characteristics of a butane-ethylene gas mixture as a refrigerant were confirmed by actually operating the refrigerating system shown in FIG. 1 and the results were used as basic data. The results are shown in Table 10 and FIG. 8.

TABLE 10

Characteristics of butane-ethylene gas mixture (loading weight: 250 g)

| Ethylene (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 5 | 5.0 | 0.2 | −53.0 |
| 10 | 8.2 | 0.3 | −70.6 |
| 15 | 7.5 | 0.2 | −77.5 |
| 20 | 10.0 | 0.6 | −71.5 |
| 30 | 12.0 | 0.4 | −81.2 |
| 35 | The experiment was discontinued because the pressure in the higher-pressure region was above 25 MPa × $10^{-1}$ at below 35% ethylene | | |

As shown in FIG. 8 on which the results of Table 10 were plotted, the interior temperature of the refrigerator extremely decreased but the pressure in the compressor side increased as the ethylene content increased.

It is desired in a ultra-low temperature refrigerator that an interior temperature of the refrigerator be below −60° C. and more preferably below −80° C. The interior temperature of the refrigerator decreased to below −60° C. at an ethylene content of 6% or more, and further decreased to −70° C., but then showed a plateau at a higher ethylene content. The interior temperature of the refrigerator decreased to below −70° C. at about 30% ethylene. However, when the ethylene content was 30% or more, the experimental operation of the system was unstable and the experiment cannot be conducted at a higher ethylene content exceeding 35%.

In order to improve the refrigerant characteristics in the range of ethylene contents in which the interior temperatures of the refrigerator were almost constant and were kept below −60° C., 5 g to 20 g of R-14 gas were added to 250 g of the butane-ethylene refrigerant gas mixtures of which mixing ratio were 90/10, 85/15, 80/20, or 70/30, i.e. ethylene contents of 10%, 15%, 20%, and 30%, respectively. The changes in characteristics depending on the amount of R-14 were observed. The experiment where R-14 gas was added to the gas mixture of butane-ethylene mixing ratio of 95/5 was discontinued because the interior temperature of the refrigerator at 1.96% R-14 did not decrease to −60° C. and desired effects were not expected.

The experimental conditions were the same as above. The results are shown in Tables 11, 12, 13, and 14 and in FIGS. 9, 10, 11, and 12, respectively.

Experiment 2

The effects of R-14 were observed by adding a predetermined amount of R-14 at an increment of 5 g to 250 g of a butane-ethylene mixture having a mixing ratio of 90/10.

TABLE 11

Effects of addition of R-14 to butane-ethylene mixture having a mixing ratio of 90/10

| R-14 (%) | Pressure in Higher-Pressure Region (MPa × 10$^{-1}$) | Pressure in Lower-Pressure Region (MPa × 10$^{-1}$) | Interior Temperature of Refrigerator (° C.) |
| --- | --- | --- | --- |
| 0 | 8.2 | 0.3 | −70.6 |
| 1.96 | 13.0 | 0.1 | −80.5 |
| 3.85 | 18.0 | 0.3 | −80.9 |
| 5.66 | 21.5 | 0.5 | −81.3 |
| 7.41 | 24.2 | 0.7 | −82.1 |

The data shown Table 11 was plotted and represented graphically in FIG. 9. The interior temperature of the refrigerator of −60° C. was already achieved when R-14 was not added (0%), and the temperature decreased below −80° C. when R-14 content was about 2%. The notable effects of R-14 were confirmed.

However, the effect was saturated at R-14 content of about 5%. The pressure in the higher-pressure region extremely increased to the upper limit in actual use at an R-14 content of about 7.4% and a stable practical operation was inhibited.

Experiment 3

The effects of R-14 were observed by adding a predetermined amount of R-14 at an increment of 5 g to 250 g of a butane-ethylene mixture having a mixing ratio of 85/15.

TABLE 12

Effects of addition of R-14 to butane-ethylene mixture having a mixing ratio of 85/15

| R-14 (%) | Pressure in Higher-Pressure Region (MPa × 10$^{-1}$) | Pressure in Lower-Pressure Region (MPa × 10$^{-1}$) | Interior Temperature of Refrigerator (° C.) |
| --- | --- | --- | --- |
| 0 | 7.5 | 0.2 | −77.5 |
| 1.96 | 13.0 | 0.2 | −81.6 |
| 3.85 | 16.0 | 0.2 | −84.0 |
| 5.66 | 18.0 | 0.3 | −85.2 |
| 7.41 | 23.5 | 0.5 | −86.2 |

The data in Table 12 was plotted and represented graphically in FIG. 10. The interior temperature of the refrigerator decreased with the amount of R-14, and the decrease in the temperature became gentle at about 4% or more. Like the above, the pressure in the higher-pressure region extremely increased at about 7.4% R-14 and the practical operation cannot be readily achieved.

Experiment 4

The effects of R-14 were observed by adding a predetermined amount of R-14 at an increment of 5 g to 250 g of a butane-ethylene mixture having a mixing ratio of 80/20.

TABLE 13

Effects of addition of R-14 to butane-ethylene mixture having a mixing ratio of 80/20

| R-14 (%) | Pressure in Higher-Pressure Region (MPa × 10$^{-1}$) | Pressure in Lower-Pressure Region (MPa × 10$^{-1}$) | Interior Temperature of Refrigerator (° C.) |
| --- | --- | --- | --- |
| 0 | 10.0 | 0.6 | −71.5 |
| 1.96 | 11.5 | 0.5 | −78.0 |
| 3.85 | 15.0 | 0.3 | −86.0 |
| 5.66 | 16.5 | 0.4 | −86.8 |
| 7.41 | 19.8 | 0.5 | −86.0 |

The data of Table 13 was plotted and represented graphically in FIG. 11. The interior temperature of the refrigerator decreased as the amount of R-14 increased. But the effect of the R-14 was the highest at about 6.0%, and then the effect gently decreased.

At the same time, the pressure in the higher-pressure region increased, and the effects of R-14 were not achieved at a content of 7.4% or more in practical operation.

Experiment 5

The effects of R-14 were observed by adding a predetermined amount of R-14 at an increment of 5 g to 250 g of a butane-ethylene mixture having a mixing ratio of 70/30.

TABLE 14

Effects of addition of R-14 to butane-ethylene mixture having a mixing ratio of 70/30

| R-14 (%) | Pressure in Higher-Pressure Region (MPa × 10$^{-1}$) | Pressure in Lower-Pressure Region (MPa × 10$^{-1}$) | Interior Temperature of Refrigerator (° C.) |
| --- | --- | --- | --- |
| 0 | 12.0 | 0.4 | −81.2 |
| 1.96 | 18.0 | 1.50 | −76.0 |
| 3.85 | 21.0 | 1.6 | −76.3 |
| 5.66 | 25.0 | 2.0 | −76.0 |
| 7.41 | 27.5 | 4.0 | −74.0 |

The data of Table 14 was plotted and represented graphically in FIG. 12. The interior temperature of the refrigerator adversely increased by the addition of R-14 and the target effects were not achieved. The pressure in the higher-pressure region steeply increased with the content of R-14 and reached the upper limit of practical operation at an R-14 content of about 14.6%. The gauge pressure in the lower-pressure region was high and showed the upper limit in actual use at an R-14 content that was slightly higher than 1%. Effects as a refrigerant were not achieved.

As observed above, the target characteristics of a refrigerant mixture according to the present invention are achieved by a butane-ethylene refrigerant mixture containing 10% to 30% ethylene and 7.5% or less of R-14.

In such a range, the ternary non-azeotropic refrigerant mixture can maintain stable conditions over broad ranges of the pressures in the higher- and lower-pressure regions and the interior temperature of the refrigerator.

(3) Confirmation of Characteristics of isobutane-ethane Mixture and Non-Azeotropic Refrigerant Mixture of R-14-Containing isobutane-ethane Gas Mixture As shown by the data in Table 1, since isobutane, the isomer of butane, has almost the same physical characteristics as those of butane, isobutane can provide a non-azeotropic refrigerant mixture having similar characteristics in the case of using butane.

The structure of the refrigerating system was the same as above (1) and (2), but a refrigerator NLE6F (Danforth Corp., brand-name: FB-75) was used. The loading weight of refrigerant gases was decreased to about a half, i.e. 100 g to 125 g. Since the capacity was small, the freezing ability such as the interior temperature of the refrigerator was slightly decreased.

TABLE 15

Characteristics of isobutane-ethane gas mixture (loading weight: 100 g)

| Ethane (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 10 | 6.5 | 0.3 | −47.0 |
| 30 | 13.5 | 1.0 | −54.0 |
| 40 | 23.0 | 0.3 | −68.0 |

TABLE 16

Effects of addition of R-14 to isobutane-ethane mixture having a mixing ratio of 90/10 (loading weight: 100 g to 130 g)

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 6.5 | 0.3 | −47 |
| 4 | 11.0 | 0.0 | −62.5 |
| 13 | 18.0 | 0.2 | −65.4 |
| 23 | 25.0 | 0.7 | −70.5 |

TABLE 17

Effects of addition of R-14 to isobutane-ethane mixture having a mixing ratio of 70/30 (loading weight: 100 g to 130 g)

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 13.5 | 1.0 | −54.0 |
| 4 | 19.0 | 1.2 | −63.0 |
| 13 | 24.0 | 1.2 | −75.2 |
| 23 | — | — | — |

The data shown in Tables 15 to 17 was plotted on FIGS. 13 to 15, respectively. Since the capacity was small, the interior temperatures of the refrigerator were slightly higher and the pressures in the higher- and lower-pressure regions were slightly higher than those of the butane-ethane refrigerant mixture. However, the characteristics as a refrigerant mixture were almost the same as those of the butane-ethane refrigerant mixture.

As shown these data, like the butane-ethane gas mixture, the effect of the isobutane-ethane mixture gradually appears from a mixing ratio of 90/10 and the pressure in the higher-pressure region reaches almost the upper limit in actual use at 40% ethane.

The addition of R-14 to the isobutane-ethane gas mixture was effective in the range of a mixing ratio of 90/10 to 70/30 even if the amount of R-14 was small. However, the pressure in the higher-pressure region steeply increased, especially as the ethane content increased. As a result, the isobutane-ethane mixing ratio of 70/30 was almost the limitation. The addition of about 15% R-14 was the upper limit in actual use.

(4) Confirmation of Characteristics of isobutane-ethylene Mixture and Non-Azeotropic Refrigerant Mixture of R-14-Containing isobutane-ethylene Gas Mixture The structure of the refrigerating system was the same as above (1) to (3), but a refrigerator GL-99EJ (Unidat Corp., brand-name: F-14L) was used for confirmation of the characteristics of isobutane-ethylene gas mixtures (loading weight: 120 g to 160 g). Other experiments were conducted by using NLE6F (Danforth Corp., brand-name: FB-75). The loading weight of the refrigerant mixture was decreased to about a half, i.e. 100 g to 125 g. Since the capacity was small, the freezing ability such as the interior temperature of the refrigerator was slightly decreased.

TABLE 18

Characteristics of isobutane-ethylene gas mixture (loading weight: 120 g to 140 g)

| Ethylene (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 3.75 | 0.07 | −28.8 |
| 14.3 | 12.3 | 0 | −68.3 |
| 17.2 | 12.0 | 0.1 | −72.0 |
| 20.0 | 11.0 | 0.2 | −73.2 |
| 22.6 | 10.5 | 0.4 | −73.8 |
| 25.0 | 12 to 10.8 | 0.4 to 0.6 | −73.9 |

Notes:
the gauge pressures at 25% ethylene were unstable.

TABLE 19

Effects of addition of R-14 to isobutane-ethylene mixture having a mixing ratio of 90/10 (loading weight: 100 g to 130 g)

| R-14 (%) | Pressure in Higher-Pressure Region (MPa × $10^{-1}$) | Pressure in Lower-Pressure Region (MPa × $10^{-1}$) | Interior Temperature of Refrigerator (° C.) |
|---|---|---|---|
| 0 | 10.5 | 0.3 | −62.8 |
| 5 | 12.5 | 0.1 | −70.5 |
| 9 | 16.5 | 0.2 | −66.3 |
| 13 | 18.5 | 0.1 | −66.0 |

TABLE 20

Effects of addition of R-14 to isobutane-ethylene mixture having a mixing ratio of 80/20 (loading weight: 100 g to 130 g)

| R-14 (%) | Pressure in Higher-Pressure Region (MPa × 10⁻¹) | Pressure in Lower-Pressure Region (MPa × 10⁻¹) | Interior Temperature of Refrigerator (° C.) |
|---|---|---|---|
| 0 | 9.5 | 0.1 | −68.8 |
| 5 | 14.0 | 0.1 | −79.9 |
| 9 | 17.0 | 0.1 | −86.4 |
| 13 | 25.0 | 0.05 | −78.0 |

TABLE 21

Effects of addition of R-14 to isobutane-ethylene mixture having a mixing ratio of 70/30 (loading weight: 100 g to 130 g)

| R-14 (%) | Pressure in Higher-Pressure Region (MPa × 10⁻¹) | Pressure in Lower-Pressure Region (MPa × 10⁻¹) | Interior Temperature of Refrigerator (° C.) |
|---|---|---|---|
| 0 | 10.0 | 0.12 | −68.3 |
| 5 | 14.5 | 0.14 | −77.1 |
| 9 | 18.5 | 0.15 | −85.6 |
| 13 | 27.0 | 0.06 | −78.2 |

The data shown in Tables 18 to 21 was plotted on FIGS. 16 to 19, respectively.

As shown in FIG. 16, since the capacity was small due to a reduction in the loading weight of the refrigerant mixture to a half, there were some differences compared with the characteristics of the butane-ethylene gas mixture. Namely, the interior temperatures of the refrigerator were slightly higher than those in the butane-ethylene gas mixture. The evaporating pressure increased with the ratio of ethylene. This steeply increases the pressure in the higher-pressure region. The pressures in both the higher- and lower-pressure regions were unstable. This phenomenon is noticeable in a lower ethylene content.

These characteristics may be caused by that the capacity of the refrigerator was small as in the case of Experiment (3). The basic characteristics of the refrigerant mixture were the same as those of the butane-ethylene gas mixture.

As shown in FIGS. 17 to 19, the interior temperatures of the refrigerator were slightly higher than those in the butane-ethylene gas mixture and the pressures in both the higher- and lower-pressure regions were higher than those of the butane-ethylene gas mixture. Especially, the pressure in the lower-pressure region, which is highly correlated to the interior temperature of the refrigerator, was high. Since the capacity of the refrigerator was small, as in Experiment (3), the characteristics as a refrigerant gas are probably the same as those of the butane-ethylene refrigerant mixture.

These data, like the butane-ethylene gas mixture, shows that the isobutane-ethylene refrigerant mixture for ultra-low temperature exhibits valuable characteristics at a mixing ratio of 90/10. The pressure conditions were unstable when the ethylene content was about 20%, which is almost the upper limit for actual use, although the upper limit is also defined by a small capacity of the refrigerator.

A small amount of addition of R-14 to the isobutane-ethylene gas mixture having the mixture range of 90/10 to 80/20 is effective. The pressure in the higher-pressure region increased with the R-14 content, but the interior temperature of the refrigerator did not so significantly decreased. The effects were saturated at about 10%.

As clearly shown by the experiments above, a non-azeotropic refrigerant mixture can achieve ultra-low temperature such as −40° C., particularly −60° C., by a single-stage refrigerating system at room-temperature atmosphere. The non-azeotropic refrigerant mixture includes a gas which has a boiling point at approximately room temperature and a low evaporating pressure and a low-boiling-point gas which is necessary for achieving ultra-low temperature.

In order to achieve the target ultra-low temperature by this non-azeotropic refrigerant mixture, it is necessary to utilize the characteristic as the non-azeotropic refrigerant mixture in the refrigerating system. Namely, the heat in the system is dissipated to the outside of the system by condensing a gas component containing a large amount of high-boiling-point gas in the compressed refrigerant gas by a condenser. Then, heat is exchanged between the refrigerant gas after the dissipation of the heat by the condenser and a refrigerant gas from an evaporator. In such a manner, that is, the heat exchange in the system and the condensation of the low-boiling-point gas are conducted by cooling the refrigerant gas in the higher-pressure region using the evaporating heat from the liquid-phase component containing a large amount of the high-boiling-point gas.

The present invention provides a refrigerant system exhibiting a maximum ability of a non-azeotropic refrigerant mixture. The maximum ability is achieved by a combination of the above-mentioned heat exchanging system and characteristics of the non-azeotropic refrigerant mixture. The present invention further provides a non-azeotropic refrigerant mixture suitable for the system. As shown in the characteristics of gases and observed in experiments regarding the behavior of the gases, it is clear that a combination of a high-boiling-point gas and at least two low-boiling-point gases has an optimum mixing ratio region.

Refrigerants other than the examples shown in the experiments can achieve a low interior temperature of the refrigerator according to the present invention. Namely, a 1-butene-ethylene refrigerant mixture shown in Table 1 achieved an interior temperature of the refrigerator of −74.5° C. (pressure in the higher-pressure region: 1.2 MPa, pressure in the lower-pressure region: 0.1 MPa, gauge pressure each, and the same hereinafter) at a mixing ratio of 70/30. Furthermore, 1-butene-ethylene refrigerant mixtures containing 5% and 10% R-14 achieved interior temperatures of the refrigerator of −77° C. (pressure in the higher-pressure region: 1.4 MPa, pressure in the lower-pressure region: 0.13 MPa) and −88° C. (pressure in the higher-pressure region: 2.0 MPa, pressure in the lower-pressure region: 0.17 MPa), respectively.

In the same way, butenes, ethylacetylene, and R-134a shown in Table 1 are applicable to the present invention due to their characteristics. A similar combination of a high-boiling-point material having a low-evaporating pressure and a low-boiling-point material can be applied to the present invention without limitation.

INDUSTRIAL APPLICABILITY

According to the present invention, a refrigerating system having a simple structure can be stably operated over a long period of time. Since the refrigerating system has the simple structure and uses inexpensive materials, the maintenance works can be conducted at a low cost without a large change in the temperature condition of the refrigerator.

A non-azeotropic refrigerant mixture for ultra-low temperature according to the present invention is composed of inexpensive gases and can readily achieve a ultra-low temperature below −60° C., specifically can stably maintain a ultra-low temperature below −80° C. Therefore, the non-azeotropic refrigerant mixture not only can be used for storage of foods as usual but also can be broadly used for long-term storage of biological tissues, specifically, valuable biological tissues used in transplantation or tissue culture. The present invention contributes toward developing the biological industries by meeting the needs of these industries.

By using a fluorocarbon together with a hydrocarbon refrigerant in the refrigerant mixture, the freezing ability is effectively improved. Since the fluorocarbon is used at a very low content, environmental disruption such as a greenhouse effect is very low.

BRIEF DESCRIPTION OF THE FIGURES

FIG. 3 is a graph showing characteristics of butane-ethane gas mixture.

FIG. 20 schematically shows gas and liquid phases conditions of a non-azeotropic refrigerant mixture (butane-ethylene).

Figure 1:
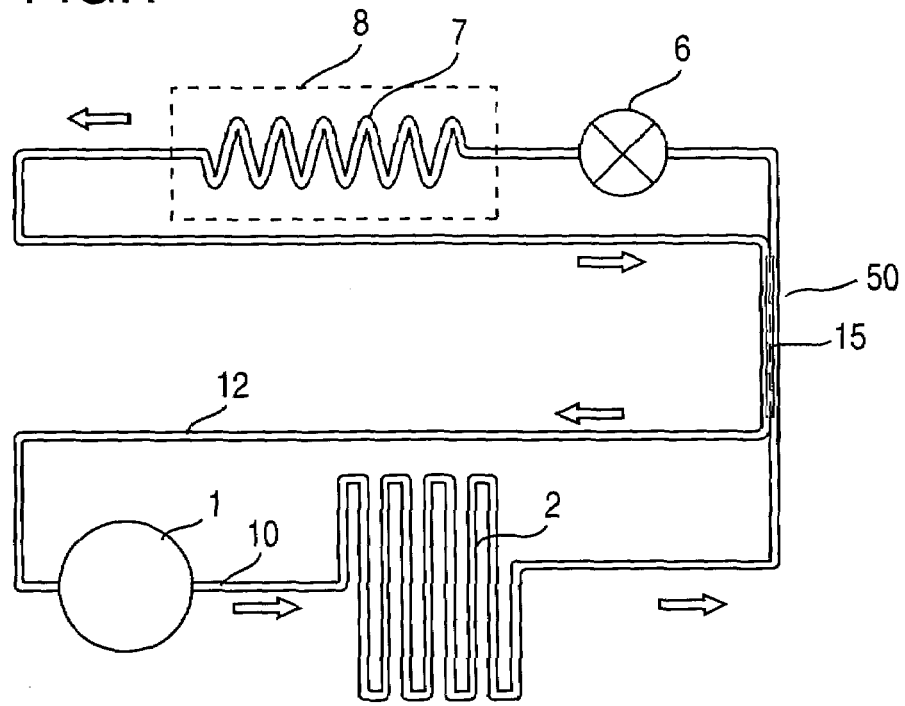
FIG. 1 conceptionally shows a refrigerating system according to the present invention.
Figure 2A:
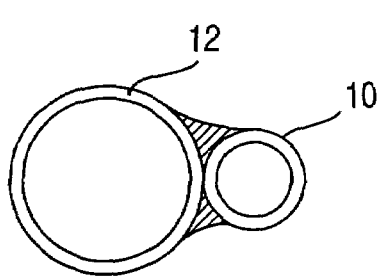
FIG. 2 shows a heat exchanger according to the present invention. In these figures, 1: compressor, 2: condenser, 6: throttle valve (capillary), 7: evaporator, 8: refrigerator, 10: forward piping for compressed gas, 12: backward piping, 50: heat exchanger, and 15: connection (soldered).
Figure 2B:
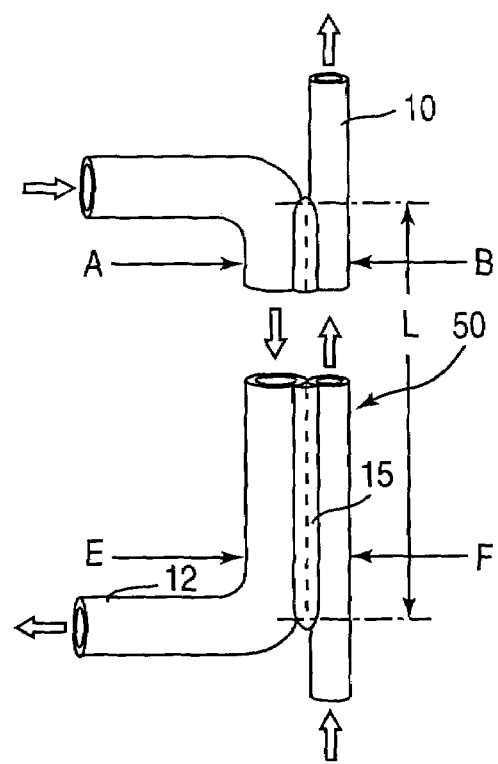
Figure 4:
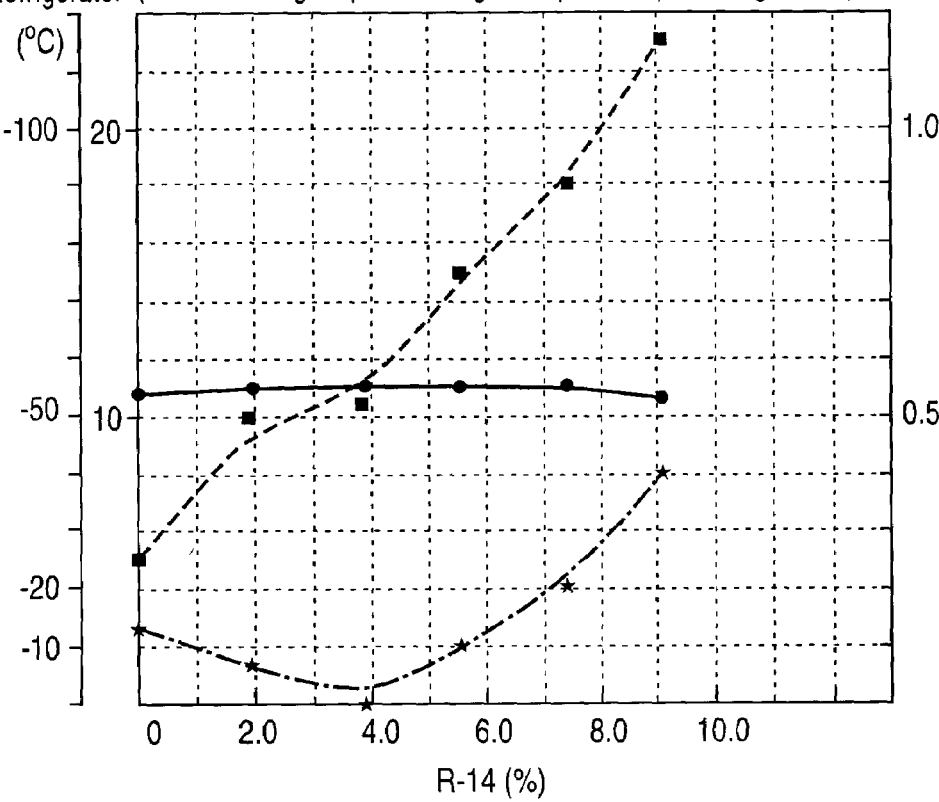
FIG. 4 is a graph showing characteristics of butane-ethane gas mixture at a mixing ratio of 90/10 and containing R-14.
Figure 5:
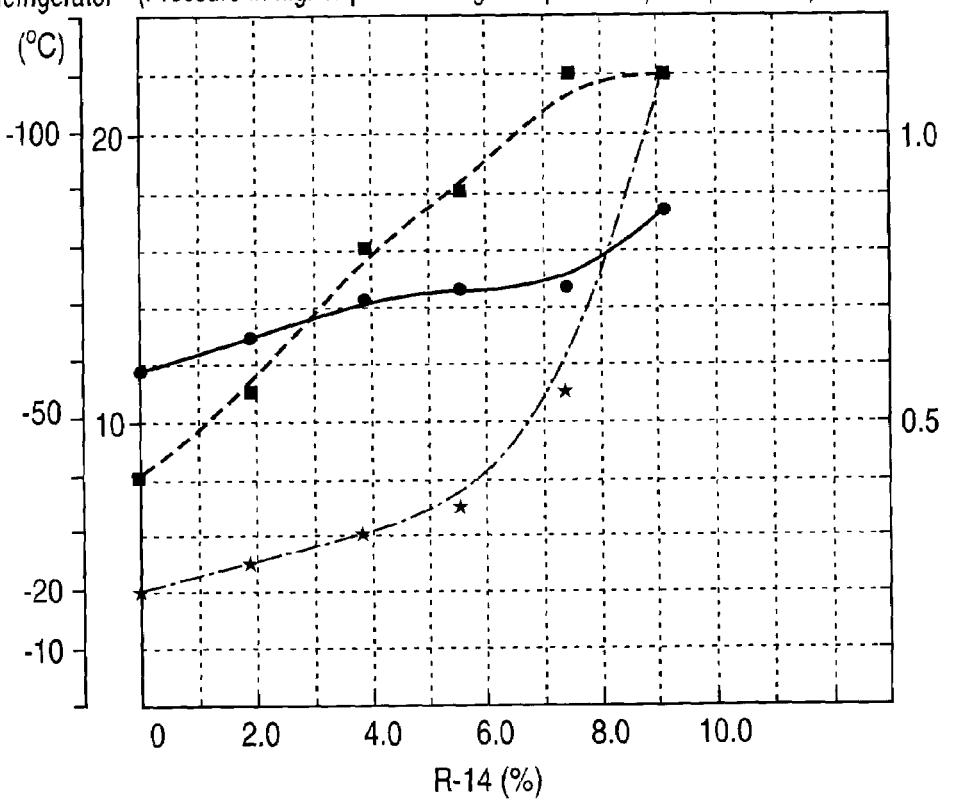
FIG. 5 is a graph showing characteristics of butane-ethane gas mixture at a mixing ratio of 80/20 and containing R-14.
Figure 6:
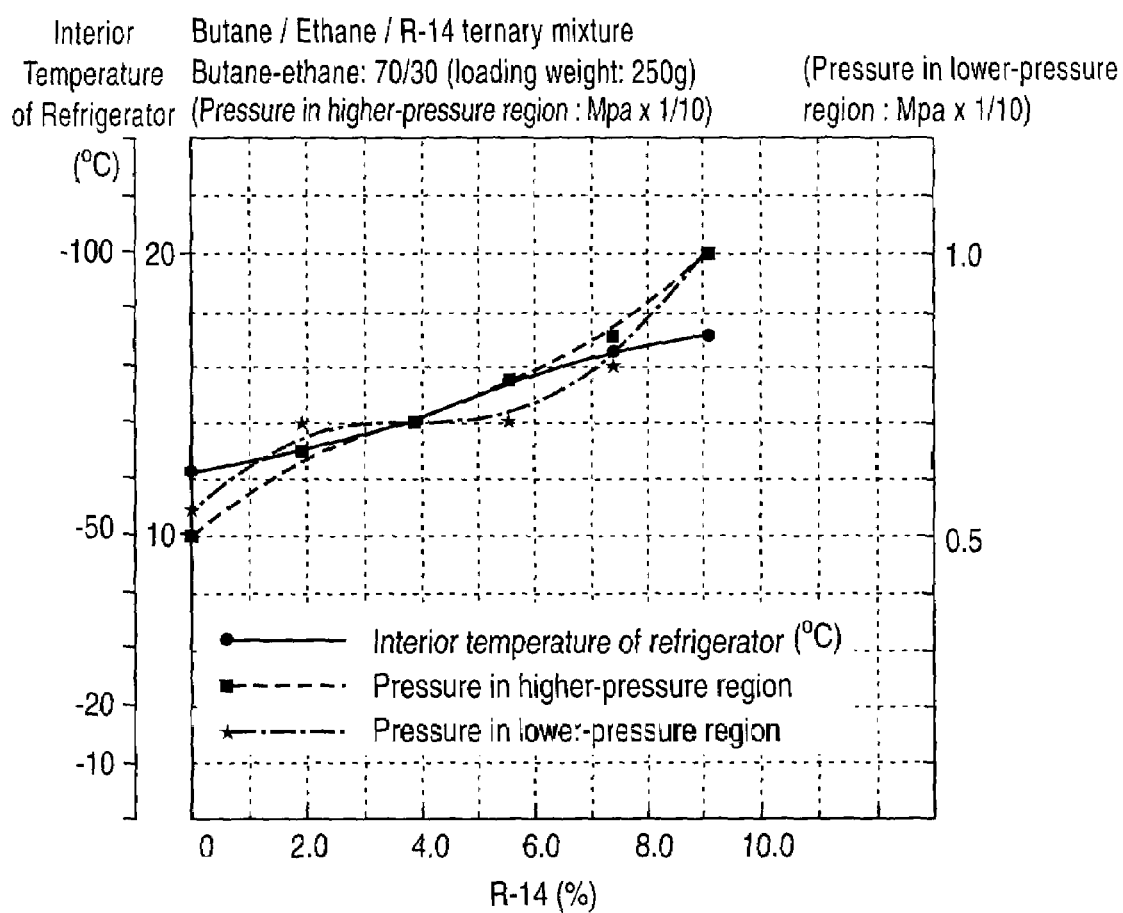
FIG. 6 is a graph showing characteristics of butane-ethane gas mixture at a mixing ratio of 70/30 and containing R-14.
Figure 7:
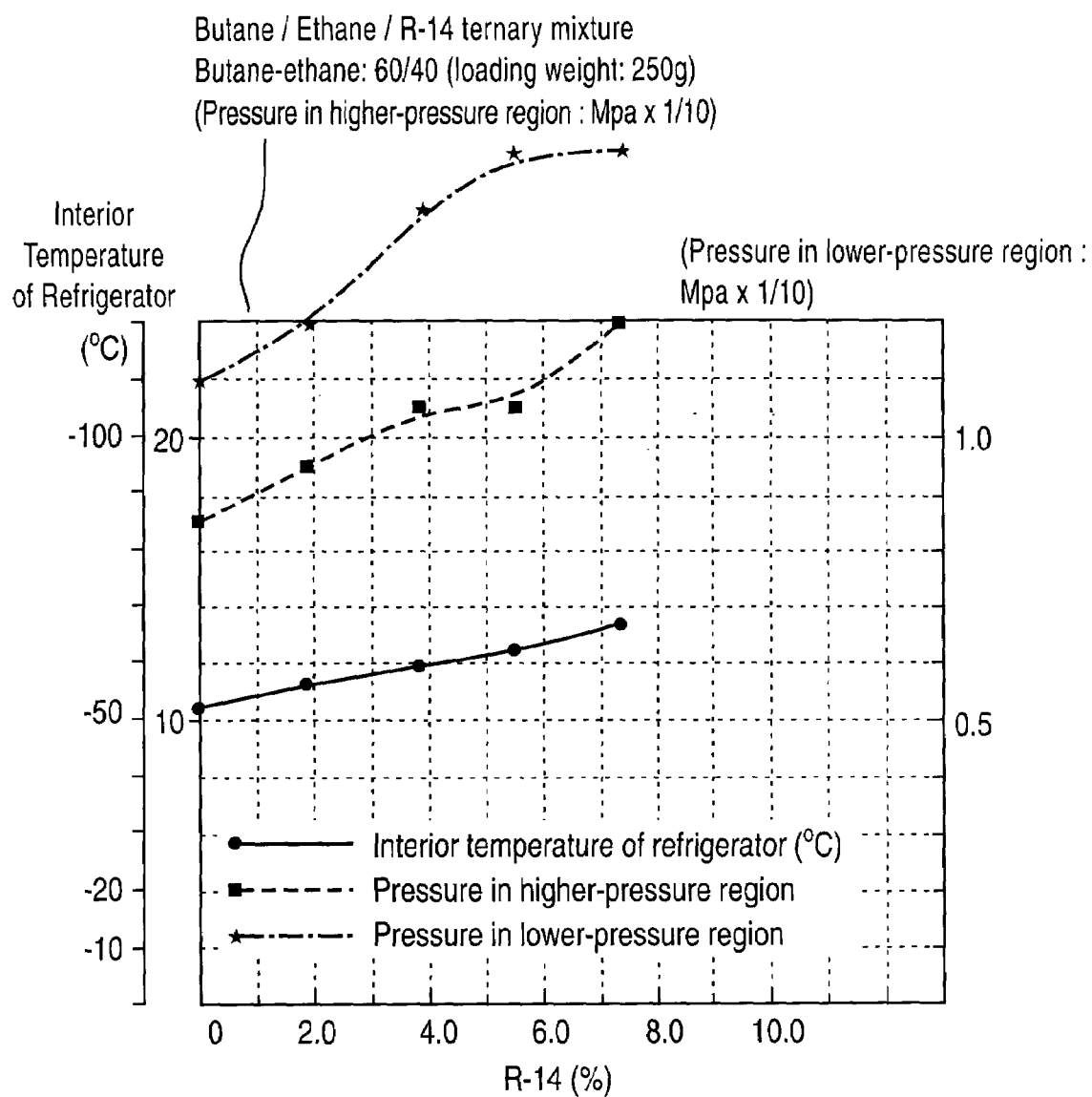
FIG. 7 is a graph showing characteristics of butane-ethane gas mixture at a mixing ratio of 60/40 and containing R-14.
Figure 8:
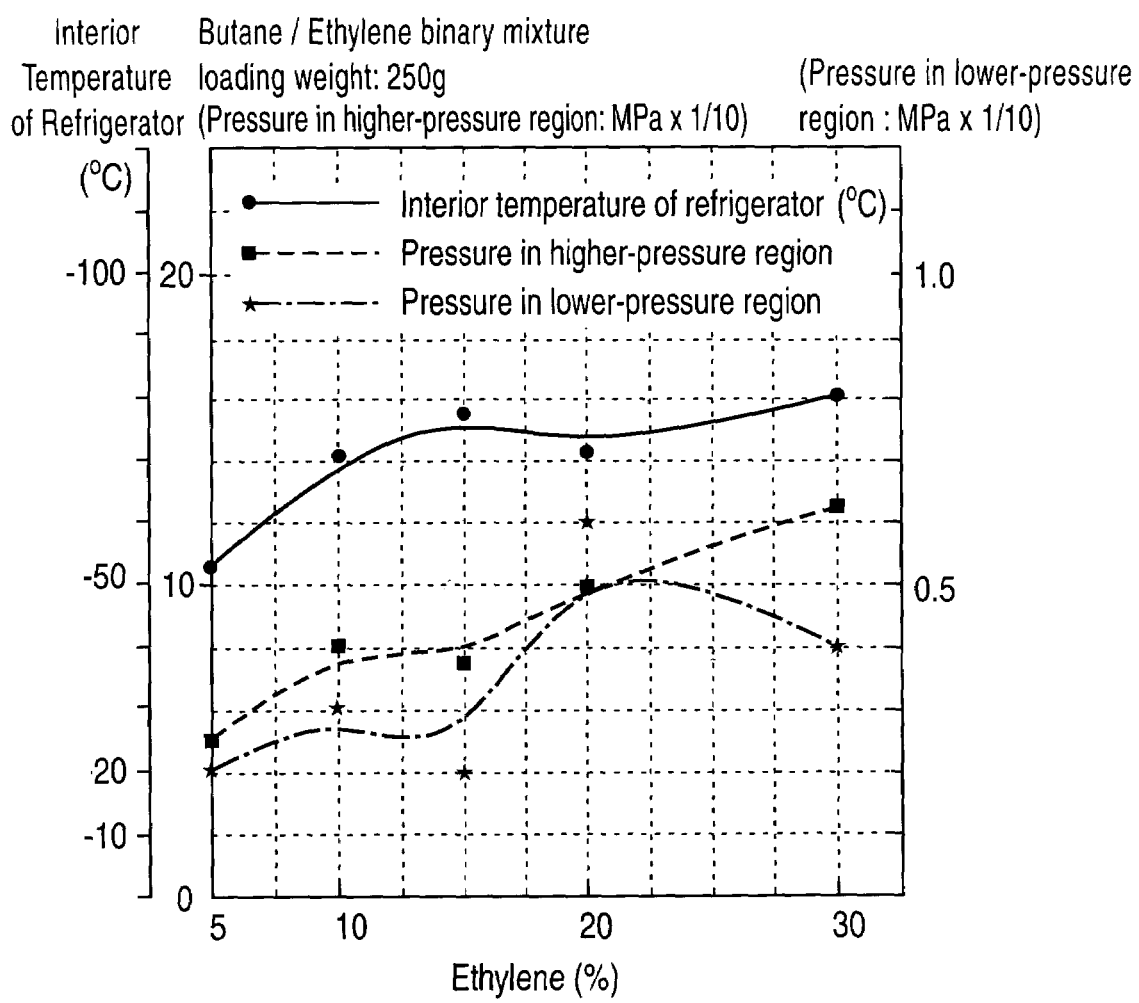
FIG. 8 is a graph showing characteristics of butane-ethylene gas mixture.
Figure 9:
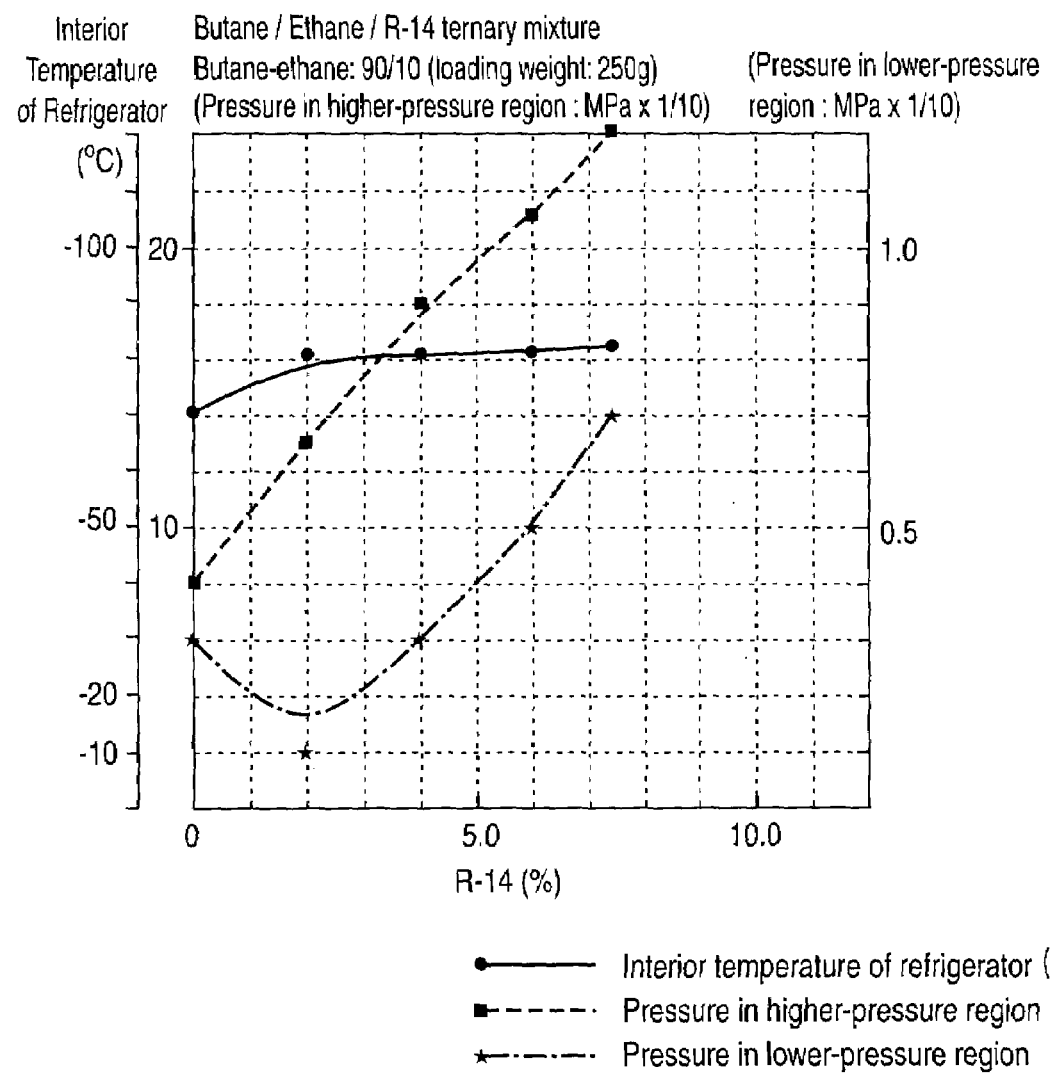
FIG. 9 is a graph showing characteristics of butane-ethylene gas mixture at a mixing ratio of 90/10 and containing R-14.
Figure 10:
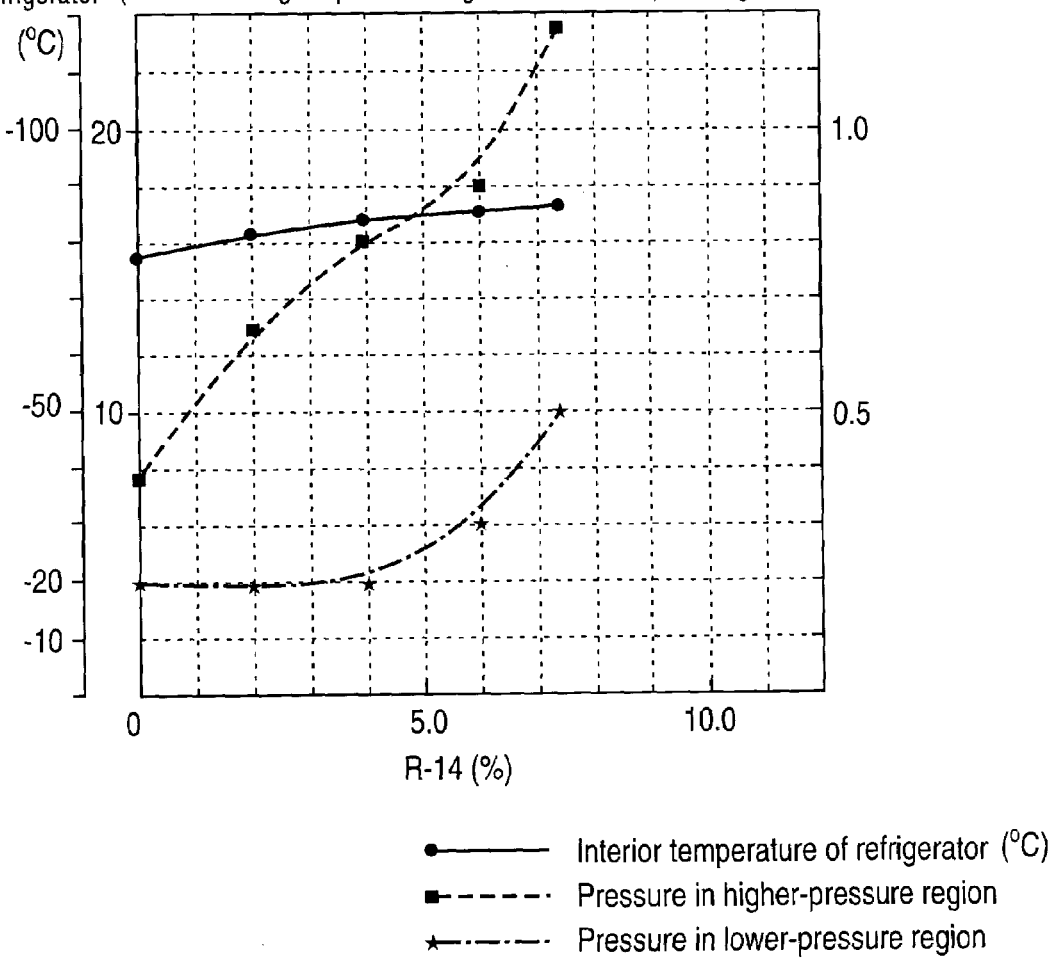
FIG. 10 is a graph showing characteristics of butane-ethylene gas mixture at a mixing ratio of 85/15 and containing R-14.
Figure 11:
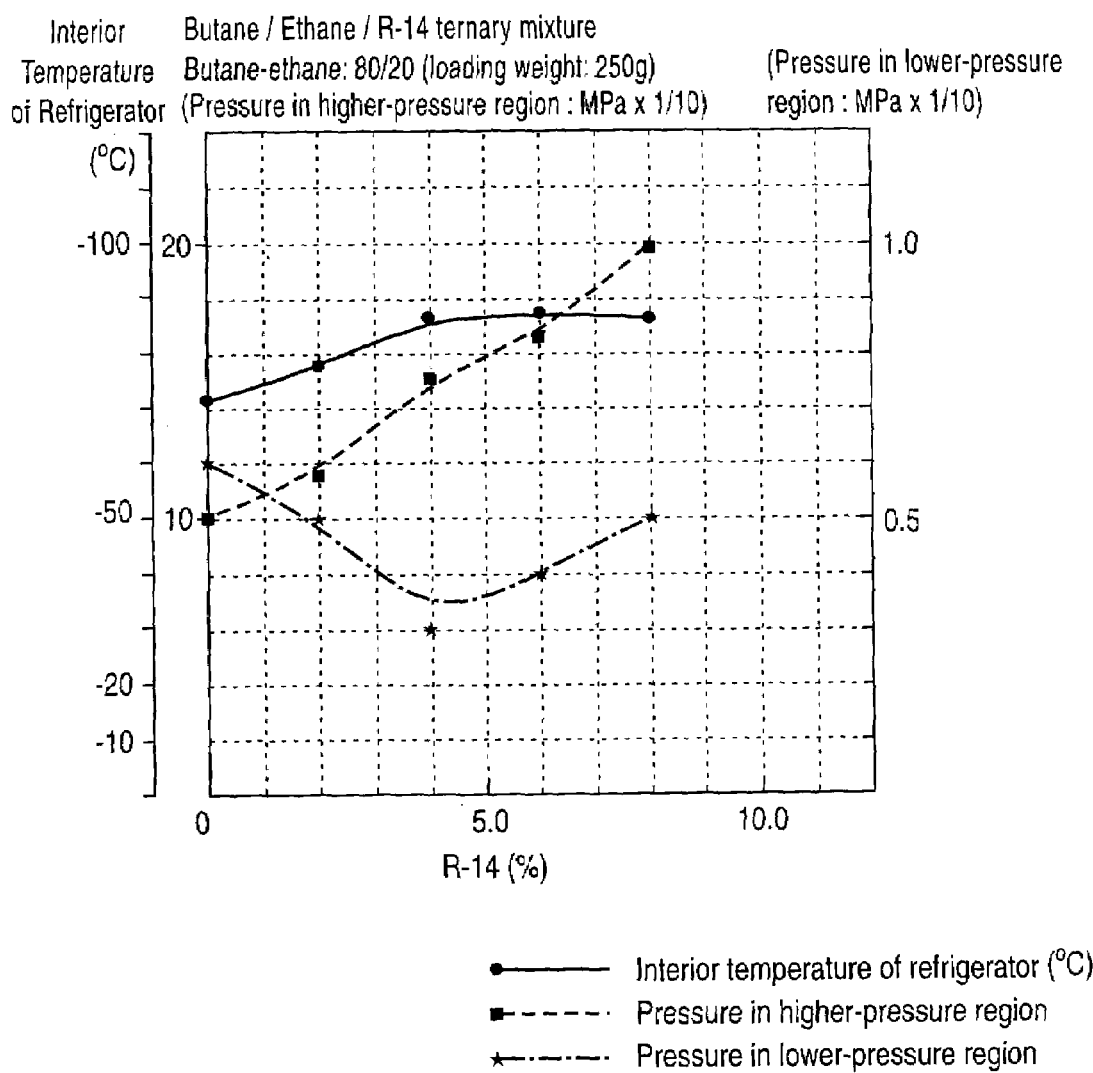
FIG. 11 is a graph showing characteristics of butane-ethylene gas mixture at a mixing ratio of 80/20 and containing R-14.
Figure 12:
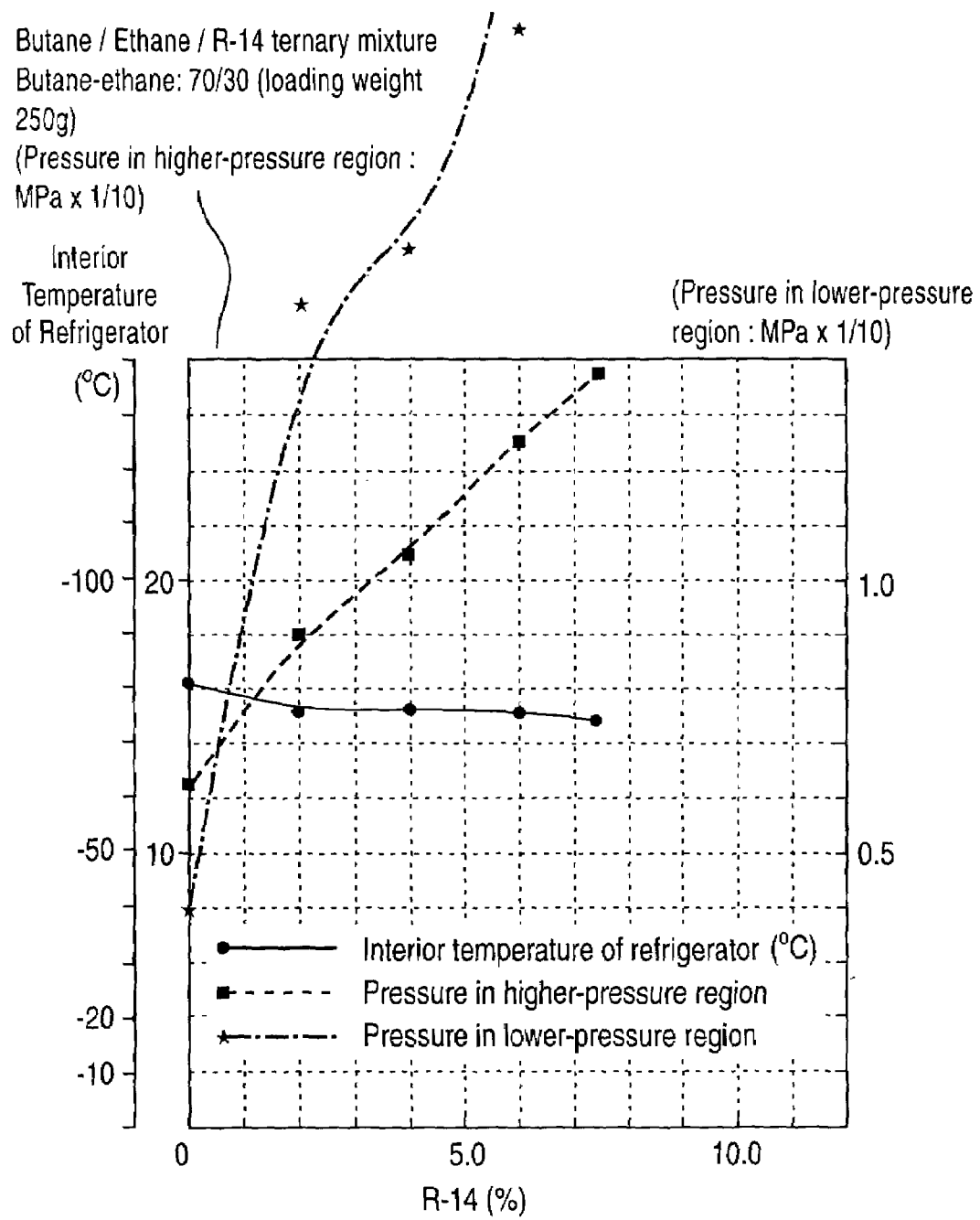
FIG. 12 is a graph showing characteristics of butane-ethylene gas mixture at a mixing ratio of 70/30 and containing R-14.
Figure 13:
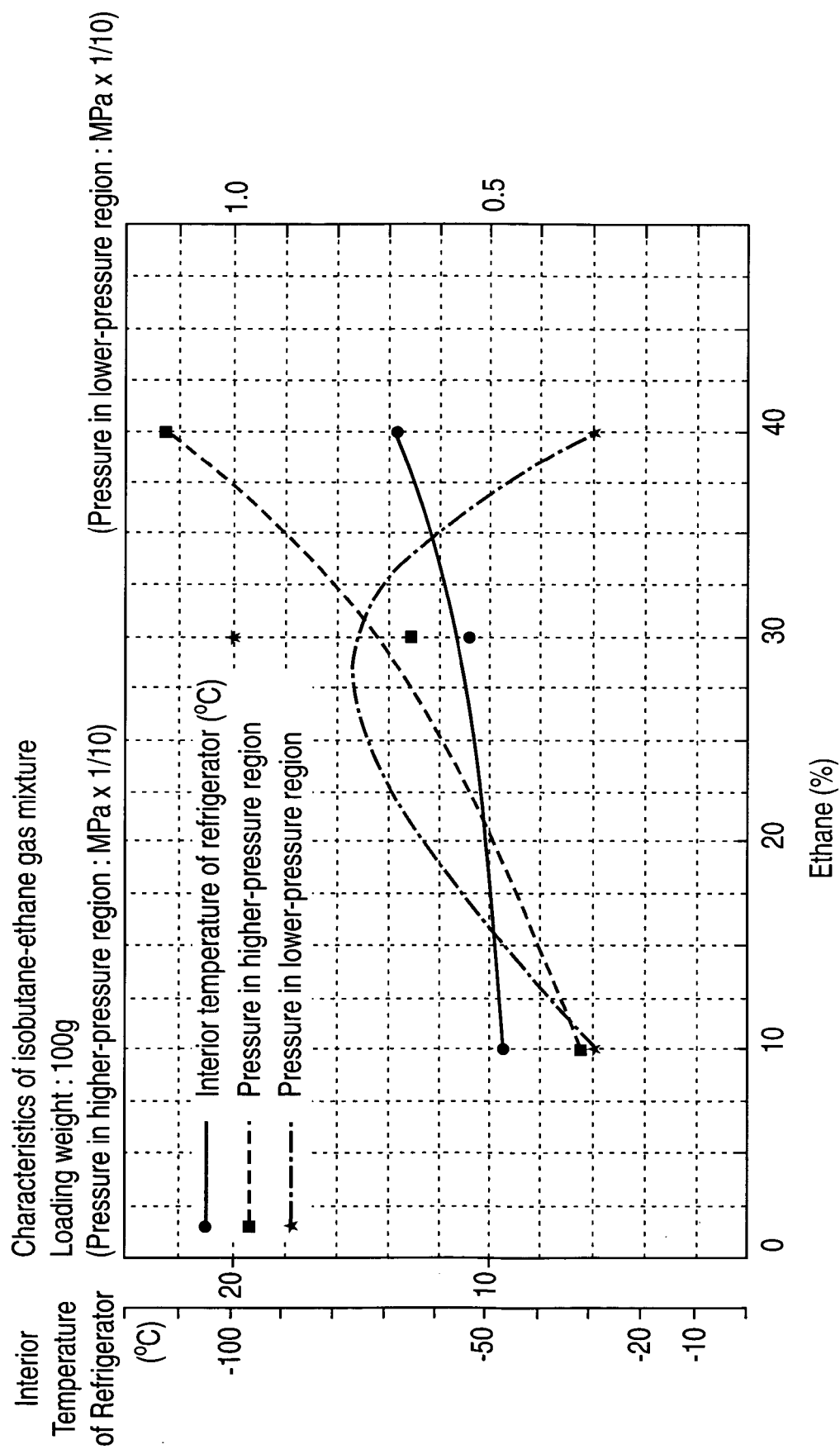
FIG. 13 is a graph showing characteristics of isobutane-ethane gas mixture.
Figure 14:
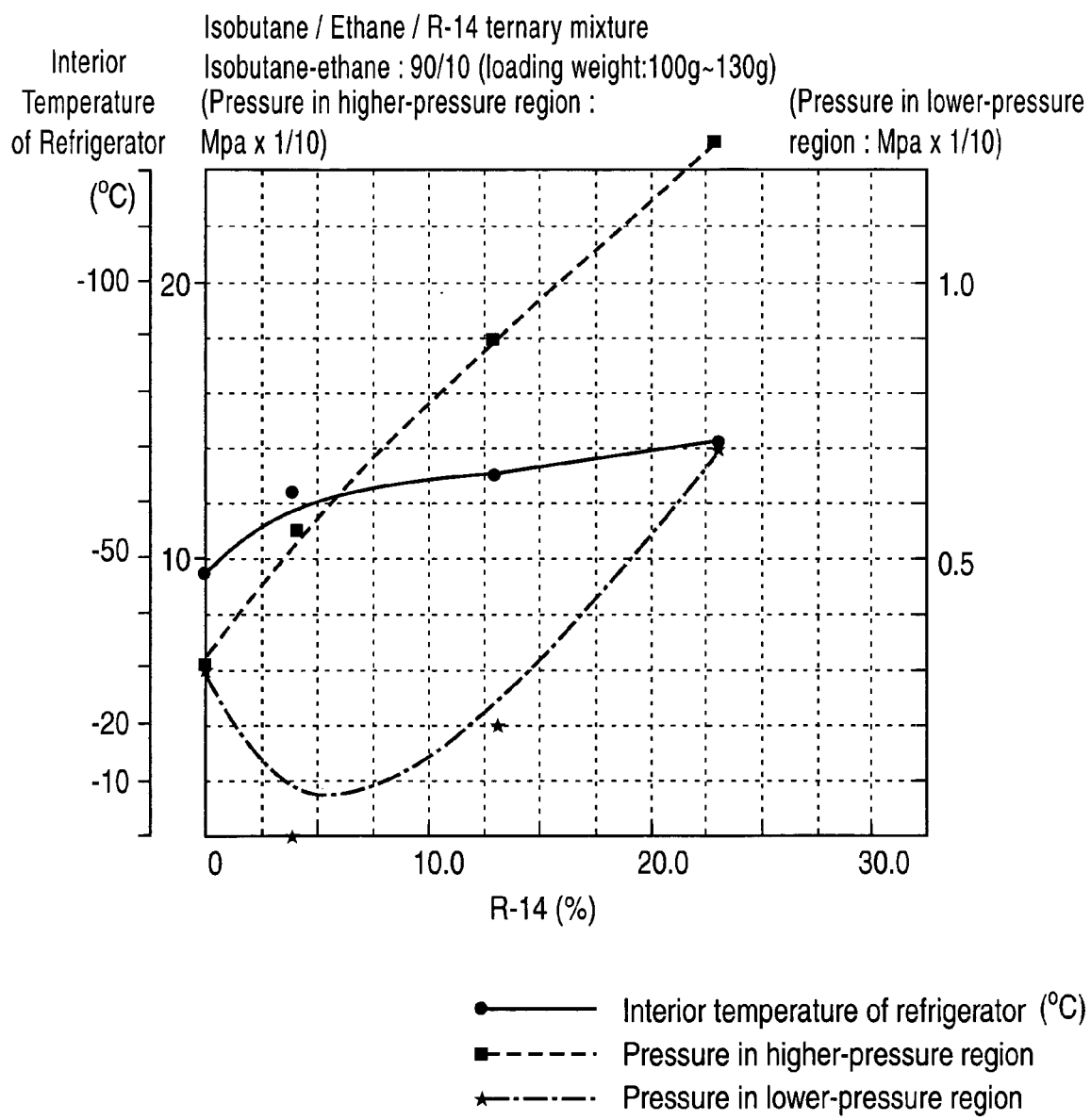
FIG. 14 is a graph showing characteristics of isobutane-ethane gas mixture at a mixing ratio of 90/10 and containing R-14.
Figure 15:
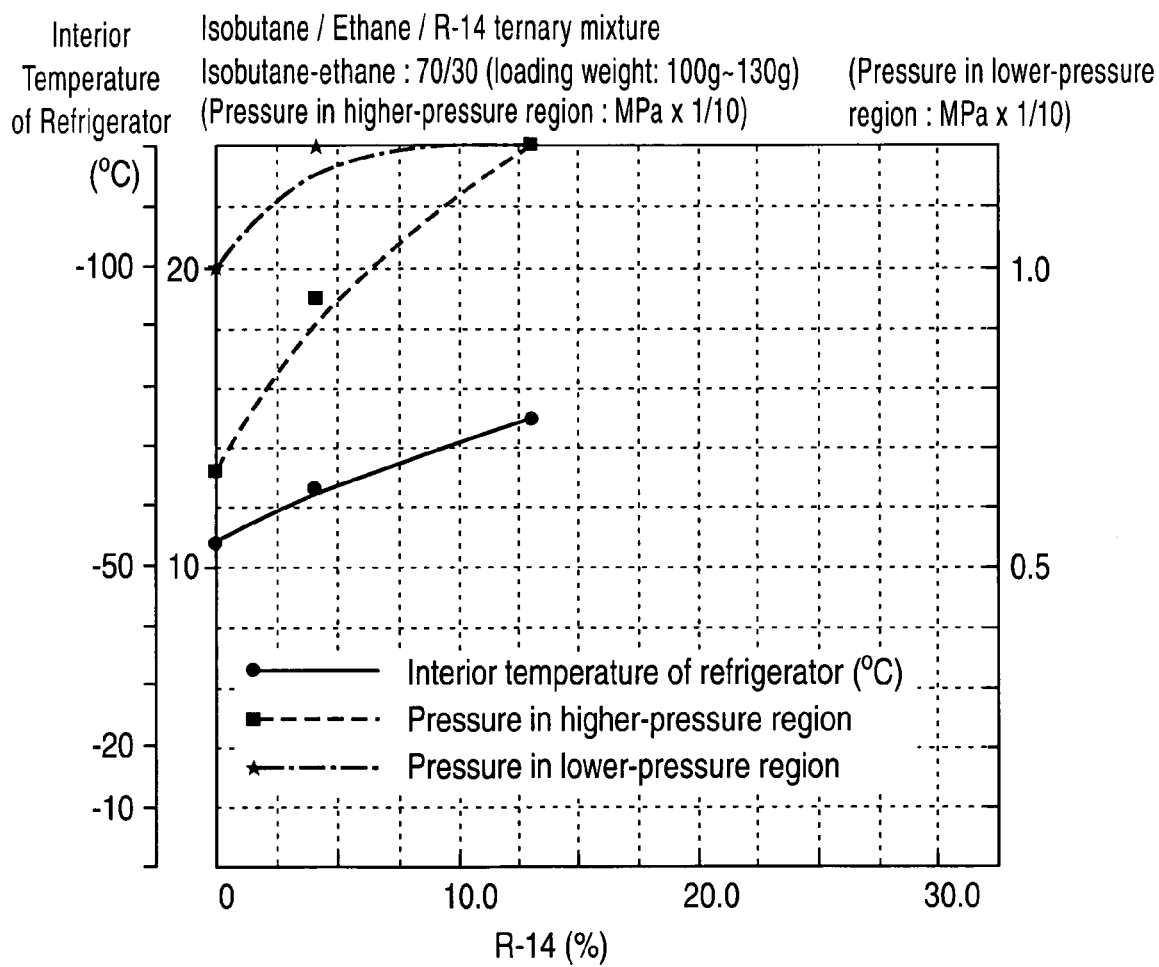
FIG. 15 is a graph showing characteristics of isobutane-ethane gas mixture at a mixing ratio of 70/30 and containing R-14.
Figure 16:
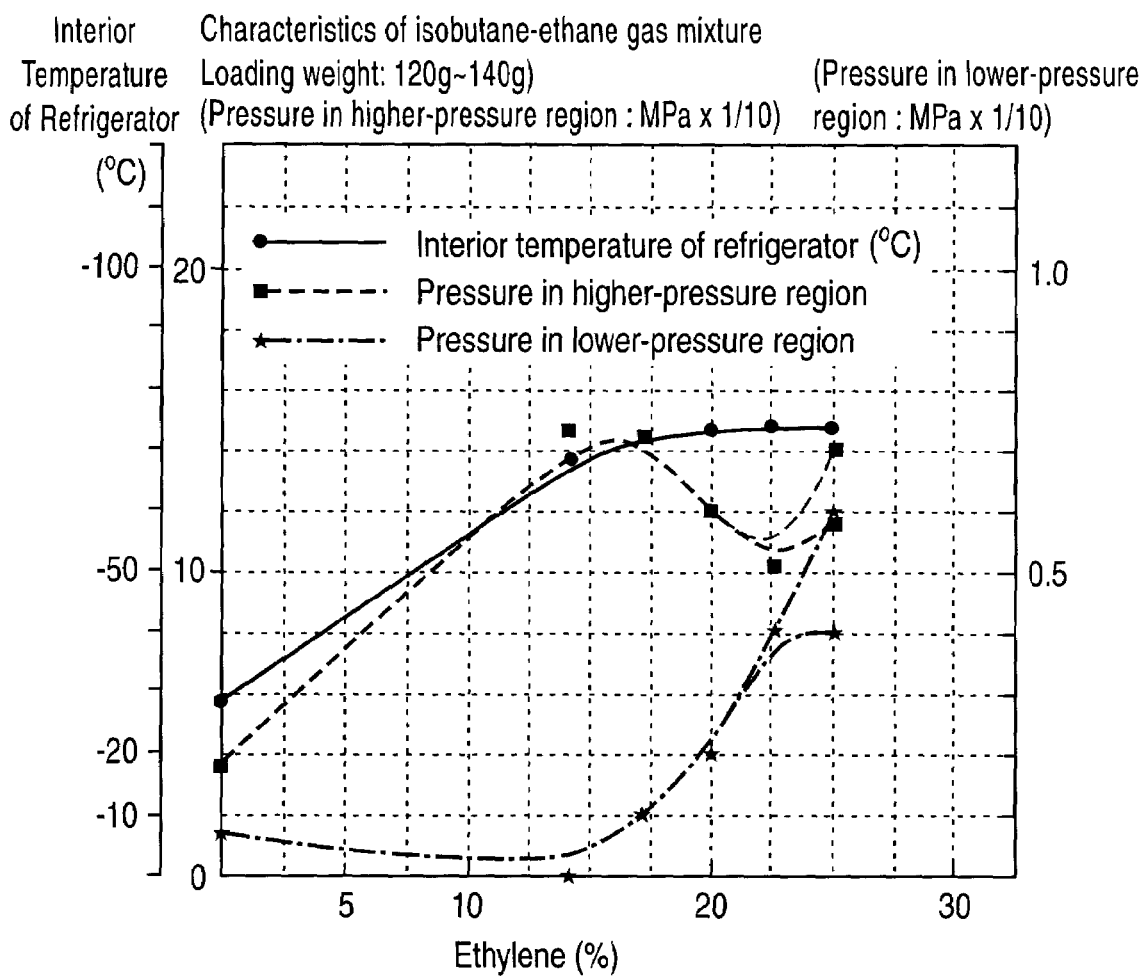
FIG. 16 is a graph showing characteristics of isobutane-ethylene gas mixture.
Figure 17:
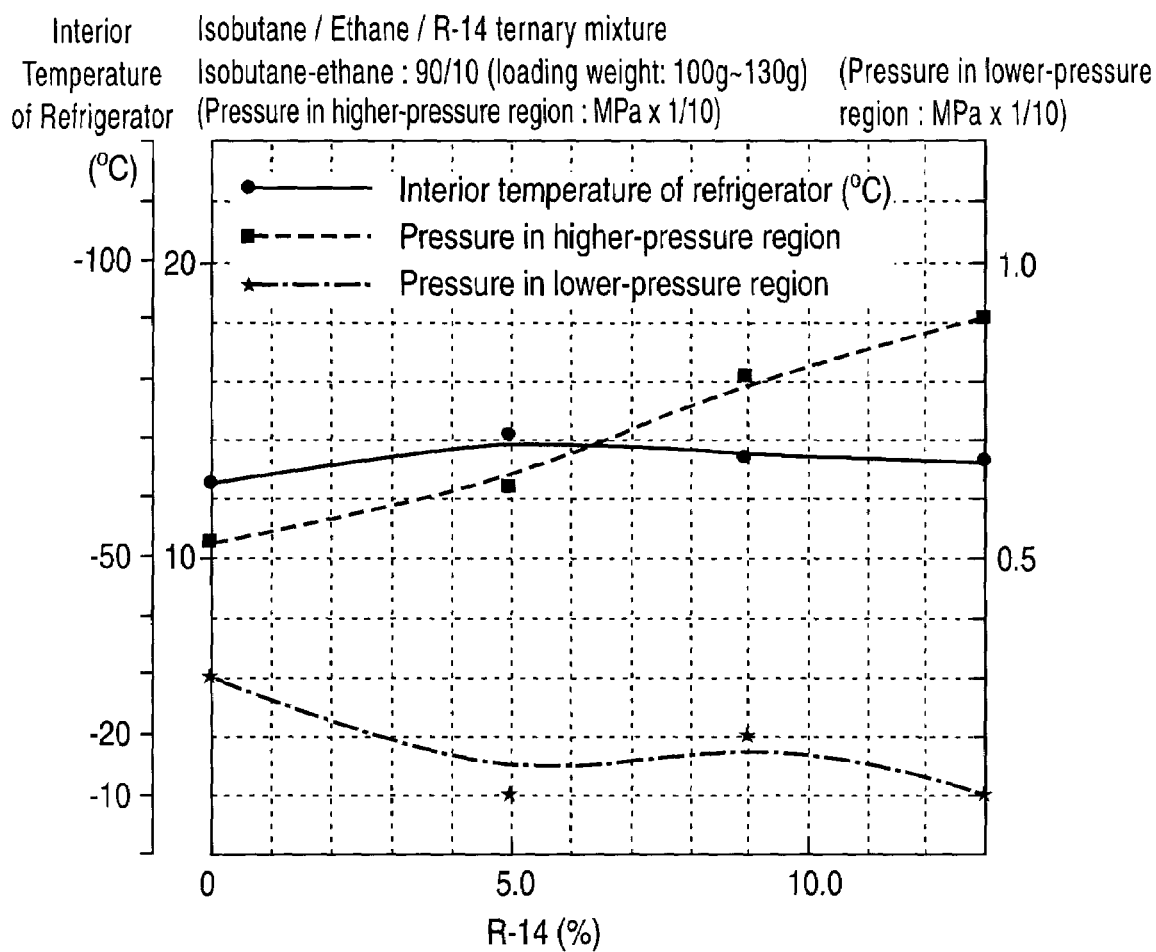
FIG. 17 is a graph showing characteristics of isobutane-ethylene gas mixture at a mixing ratio of 90/10 and containing R-14.
Figure 18:
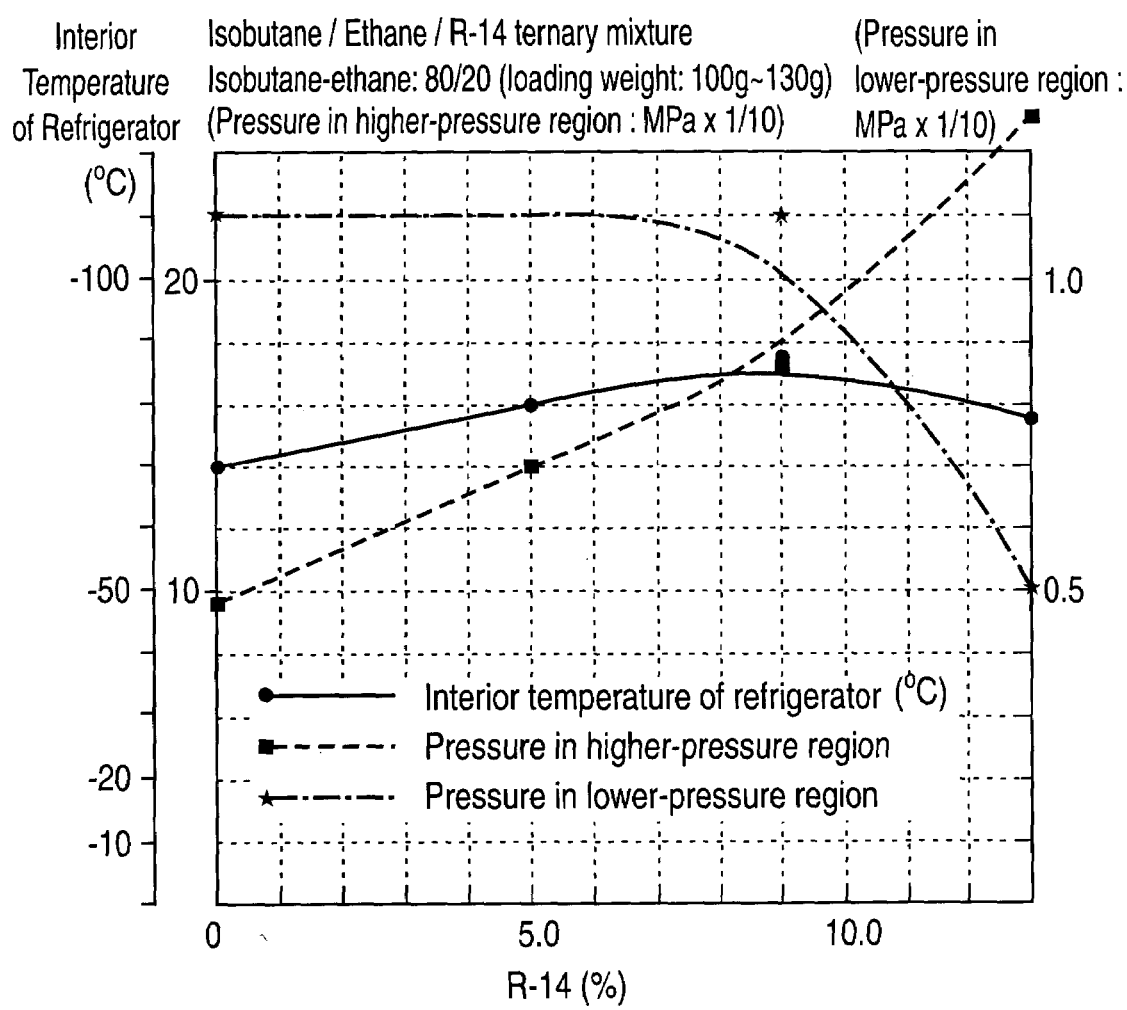
FIG. 18 is a graph showing characteristics of isobutane-ethylene gas mixture at a mixing ratio of 80/20 and containing R-14.
Figure 19:
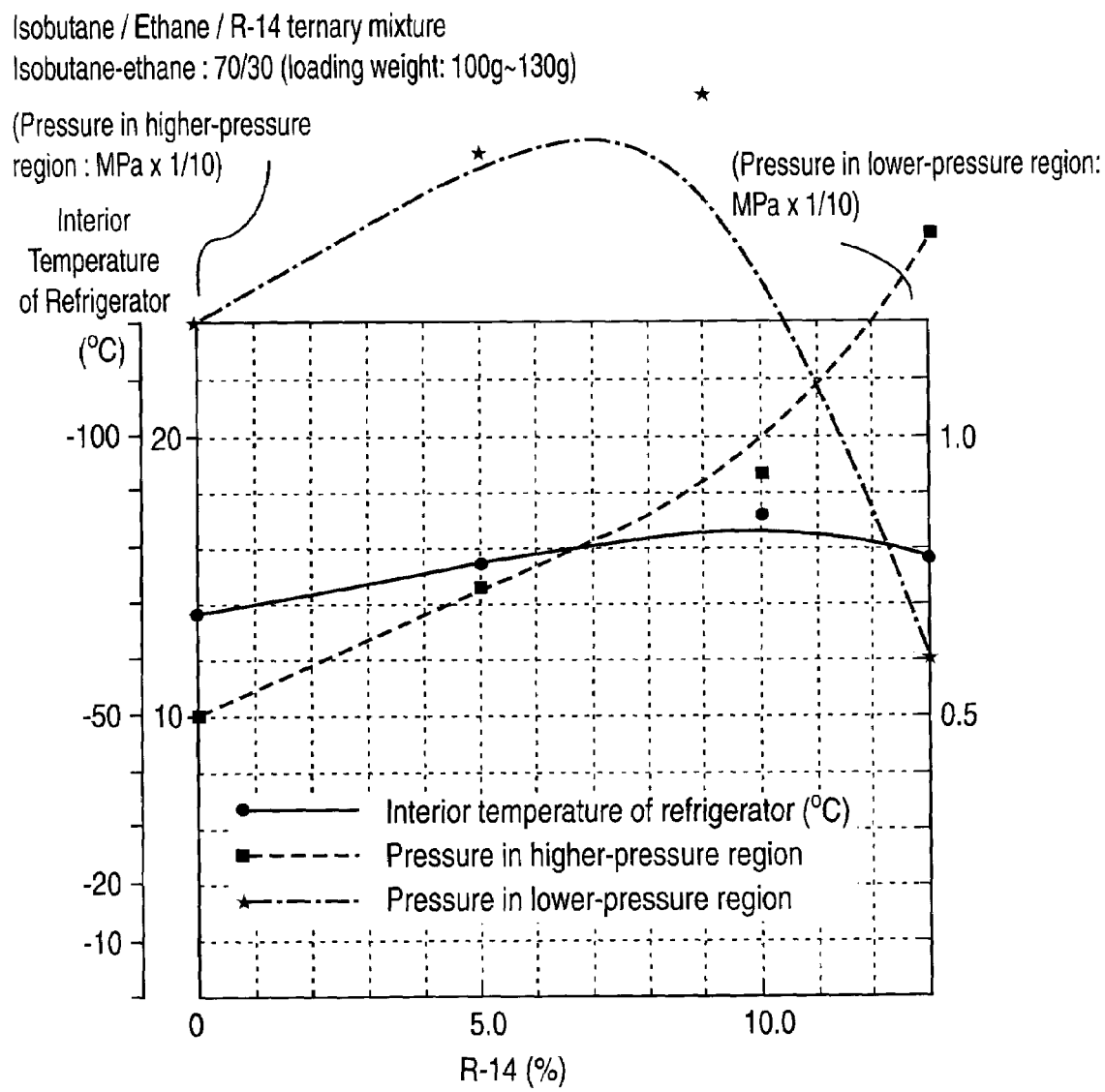
FIG. 19 is a graph showing characteristics of isobutane-ethylene gas mixture at a mixing ratio of 70/30 and containing R-14.

What is claimed is:

1. A refrigerating system using a non-azeotropic refrigerant mixture, wherein
   the non-azeotropic refrigerant mixture comprises a refrigerant having a normal boiling point of approximately room temperature and a low-boiling-point refrigerant having a normal boiling point of −60° C. or less;
   the refrigerating system is a single-stage refrigerating system comprising a compressor, a condenser, an evaporator, and a heat exchanger for exchanging heat between a refrigerant in a path from the evaporator to the compressor and a refrigerant in another path from the condenser to the evaporator;
   a dew point of the refrigerant mixture at a pressure in the condensing process after the compression is above room temperature; and
   the refrigerating system is operated in the range in which the boiling point is higher than the dew point at a pressure in the lower-pressure region in the path from the evaporator to the compressor.

2. A non-azeotropic refrigerant mixture used in a single-stage refrigerating system comprising a compressor, a condenser, an evaporator, and a heat exchanger for exchanging heat between a refrigerant in a process from the evaporator to the compressor and a refrigerant in a path from the condenser to the evaporator, wherein
   the non-azeotropic refrigerant mixture comprises a refrigerant having a normal boiling point of approximately room temperature and a low-boiling-point refrigerant having a normal boiling point of −60° C. or less;
   a dew point of the refrigerant mixture at a pressure in the condensing process after the compression is above room temperature; and
   the boiling point is higher than the dew point at a pressure in the lower-pressure region in the path from the evaporator to the compressor.

3. The non-azeotropic refrigerant mixture for ultra-low temperature according to claim 2, wherein
   the high-boiling-point refrigerant gas having a normal boiling point of approximately room temperature is at least one selected from the group consisting of butane, isobutane, butanes, R134a, and ethylacetylene; and
   the low-boiling-point refrigerant gas having a normal boiling point of −60° C. or less is at least one selected from the group consisting of ethane, ethylene, and R-14.

4. The non-azeotropic refrigerant mixture for ultra-low temperature according to claim 3, wherein
   the high-boiling-point refrigerant gas having a normal boiling point of approximately room temperature is butane or isobutane;
   the low-boiling-point refrigerant gas having a normal boiling point of −60° C. or less is ethane or ethylene; and
   the characteristics are improved by adding R-14 (perfluoromethane) to the gas mixture.

5. The non-azeotropic refrigerant mixture for ultra-low temperature according to claim 4, wherein
   the high-boiling-point gas is butane and the low-boiling-point gas is ethane;

the mixing ratio of the butane-ethane gas mixture is in the range from 90/10 to 60/40; and the content of R-14 (perfluoromethane) in the gas mixture is between above 0% and 9%.

6. The non-azeotropic refrigerant mixture for ultra-low temperature according to claim 4, wherein the high-boiling-point gas is butane and the low-boiling-point gas is ethylene;

the mixing ratio of the butane-ethylene gas mixture is in the range from 90/10 to 70/30; and the content of R-14 (perfluoromethane) in the gas mixture is between above 0% and 7.5%.

7. The non-azeotropic refrigerant mixture for ultra-low temperature according to claim 4, wherein the high-boiling-point gas is isobutane and the low-boiling-point gas is ethane;

the mixing ratio of the isobutane-ethane gas mixture is in the range from 90/10 to 70/30; and the content of R-14 (perfluoromethane) in the gas mixture is between above 0% and 15%.

8. The non-azeotropic refrigerant mixture for ultra-low temperature according to claim 4, wherein p1 the high-boiling-point gas is isobutane and the low-boiling-point gas is ethylene;

the mixing ratio of the isobutane-ethylene gas mixture is in the range from 90/10 to 80/20; and the content of R-14 (perfluoromethane) in the gas mixture is between above 0% and 10%.

* * * * *